United States Patent
Lalonde et al.

(10) Patent No.: US 10,363,657 B2
(45) Date of Patent: Jul. 30, 2019

(54) MULTI-AGENT COORDINATION UNDER SPARSE NETWORKING

(71) Applicant: X DEVELOPMENT LLC, Mountain View, CA (US)

(72) Inventors: Geoffrey Lalonde, Mountain View, CA (US); Peter Anderson-Sprecher, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 161 days.

(21) Appl. No.: 15/390,013

(22) Filed: Dec. 23, 2016

(65) Prior Publication Data

US 2018/0178376 A1 Jun. 28, 2018

(51) Int. Cl.
*G05B 19/418* (2006.01)
*B25J 9/00* (2006.01)
(Continued)

(52) U.S. Cl.
CPC ........... *B25J 9/0084* (2013.01); *B25J 9/1651* (2013.01); *B25J 9/1666* (2013.01); *B25J 9/1676* (2013.01);
(Continued)

(58) Field of Classification Search
CPC ...... B25J 9/0084; B25J 9/1666; B25J 9/1651; B25J 9/1676; G05D 1/0289;
(Continued)

(56) References Cited

U.S. PATENT DOCUMENTS 6,049,756 A 4/2000 Libby
7,974,737 B2 7/2011 Tilove et al.
(Continued)

FOREIGN PATENT DOCUMENTS

WO WO02082195 10/2002
WO 2005/096114 A1 10/2015
WO 2016/122840 A1 1/2016

OTHER PUBLICATIONS

P. Abbeel, "Optimal Control for Linear Dynamical Systems and Quadratic Cost ('LQR')", Sep. 4, 2012, available via the Internet at people.eecs.berkeley.edu/~pabbeel/cs287-fa12/slides/LQR.pdf (last visited Oct. 27, 2016).

(Continued)

*Primary Examiner* — Khoi H Tran
*Assistant Examiner* — Jorge O Peche
(74) *Attorney, Agent, or Firm* — McDonnell Boehnen Hulbert & Berghoff LLP

(57) ABSTRACT

A method includes receiving a first time-parameterized path for the first robotic device, and an indication of a second robotic device having a second time-parameterized path that overlaps with the first time-parameterized path at a first location. The method also includes executing, by the first robotic device, a first portion of the first time-parameterized path before reaching the first location, wherein execution of the first portion corresponds to a first rate of progress of the first robotic device along the first time-parameterized path. The first robotic device then receives a communication signal from the second robotic device indicating a second rate of progress of the second robotic device along the second time-parameterized path. The method then includes the first robotic device determining a difference between the first rate of progress and the second rate of progress, and modifying execution of the first time-parameterized path based on the determined difference.

19 Claims, 12 Drawing Sheets

(51) Int. Cl.
 *B25J 9/16* (2006.01)
 *G05D 1/02* (2006.01)
 *G08G 1/16* (2006.01)

(52) U.S. Cl.
 CPC ......... *G05D 1/0214* (2013.01); *G05D 1/0223* (2013.01); *G05D 1/0289* (2013.01); *G05D 1/024* (2013.01); *G05D 2201/0206* (2013.01); *G05D 2201/0216* (2013.01); *G08G 1/163* (2013.01); *Y10S 901/01* (2013.01)

(58) Field of Classification Search
 CPC ............... G05D 1/0214; G05D 1/0223; G05D 2201/0206; G05D 2201/0216; Y10S 901/01
 See application file for complete search history.

(56) References Cited

U.S. PATENT DOCUMENTS

| | | | |
|---|---|---|---|
| 7,991,505 B2 * | 8/2011 | Lert, Jr. | B65G 1/0492 198/347.1 |
| 8,576,235 B1 | 11/2013 | Sumner et al. | |
| 8,630,762 B2 | 1/2014 | Staempfle et al. | |
| 8,948,959 B2 | 2/2015 | Maggi | |
| 8,972,056 B2 | 3/2015 | Petersen et al. | |
| 9,442,489 B2 * | 9/2016 | Reichel | G08G 1/0965 |
| 9,555,545 B2 * | 1/2017 | Linnell | B25J 9/1656 |
| 9,701,307 B1 * | 7/2017 | Newman | B60W 50/16 |
| 10,207,406 B2 * | 2/2019 | Maeda | B25J 9/0087 |
| 2004/0167717 A1 * | 8/2004 | Buchanan | B60K 31/0008 701/301 |
| 2005/0156562 A1 * | 7/2005 | Cohen | A47L 9/2857 320/107 |
| 2009/0326711 A1 * | 12/2009 | Chang | B25J 9/1666 700/248 |
| 2010/0256852 A1 * | 10/2010 | Mudalige | G08G 1/163 701/24 |
| 2011/0066282 A1 * | 3/2011 | Bosscher | B25J 9/1676 700/248 |
| 2011/0304633 A1 * | 12/2011 | Beardsley | B25J 9/1666 345/474 |
| 2013/0325210 A1 * | 12/2013 | Palm | G05D 1/0289 701/2 |
| 2014/0032035 A1 | 1/2014 | Thomson | |
| 2014/0121833 A1 | 5/2014 | Lee et al. | |
| 2014/0214469 A1 | 7/2014 | Callow et al. | |
| 2014/0277691 A1 | 9/2014 | Jacobus et al. | |
| 2014/0350831 A1 | 11/2014 | Hoffman et al. | |
| 2014/0372016 A1 * | 12/2014 | Buchholz | G08G 1/161 701/117 |
| 2015/0234386 A1 | 8/2015 | Zini et al. | |
| 2015/0251315 A1 | 9/2015 | Brandenberger | |
| 2015/0286219 A1 * | 10/2015 | Reichel | G08G 1/0965 701/23 |
| 2015/0294564 A1 * | 10/2015 | Villar | G08G 1/127 701/117 |
| 2016/0117936 A1 * | 4/2016 | Klinger | G08G 1/162 701/3 |
| 2016/0132059 A1 | 5/2016 | Mason et al. | |
| 2016/0176638 A1 * | 6/2016 | Toebes | G06Q 10/087 700/216 |
| 2016/0343248 A1 * | 11/2016 | Mende | G01S 13/87 |
| 2016/0377381 A1 * | 12/2016 | Lyren | F41G 3/04 345/633 |
| 2017/0210008 A1 * | 7/2017 | Maeda | B25J 9/0087 |
| 2017/0300049 A1 * | 10/2017 | Seally | G06Q 10/047 |
| 2017/0351267 A1 * | 12/2017 | Mielenz | B60W 30/06 |
| 2018/0178382 A1 * | 6/2018 | Lalonde | B25J 9/1666 |
| 2018/0321689 A1 * | 11/2018 | Lehmann | G05D 1/0289 |
| 2018/0362033 A1 * | 12/2018 | Newman | B60W 30/0956 |

OTHER PUBLICATIONS

M. H. Bowling et al., "Multiagent Planning in the Presence of Multiple Goals", Planning in Intelligent Systems: Aspects, Motivations, and Methods, Feb. 15, 2006, Chapter 10, available via the Internet at www.cs.cmu.edu/~mmv/papers/05planning.pdf (last visited Oct. 5, 2016).

V. Digani et al., "Ensemble Coordination Approach to Multi-AGV Systems Applied to Industrial Warehouses", IEEE Transactions on Automation Science and Engineering, vol. 12, No. 3, Jul. 2015, pp. 922-934.

D. Fox et al., "The Dynamic Window Approach to Collision Avoidance", Jun. 25, 1996, available via the Internet at www.ri.cmu.edu/pub_files/pub1/fox_dieter_1997_1/fox_dieter_1997_1.pdf (last visited Dec. 20, 2016).

R. M. Jensen et al., "ASET: a Multi-Agent Planning Language with Nondeterministic Durative Tasks for BDD-Based Fault Tolerant Planning", Apr. 20, 2005, available via the Internet at www.cs.cmu.edu/~mmv/papers/05icapsw-aset.pdf (last visited Dec. 20, 2016).

L. E. Kavraki et al., "Probabilistic Roadmaps for Path Planning in High-Dimensional Configuration Spaces", IEEE Transactions on Robotics and Automation, vol. 12, No. 4, Aug. 1996, pp. 566-570.

A. Majumdar et al., "Multi-Query Feedback Motion Planning with LQR-Roadmaps", Mar. 30, 2011, available via the Internet at groups.csail.mit.edu/robotics-center/public_papers/Majumdar11.pdf (last visited Dec. 20, 2016).

S. Saha et al., "Trajectory-Based Formal Controller Synthesis for Multi-Link Robots with Elastic Joints", Dec. 15, 2014, 2014 IEEE 53rd Annual Conference on Decision and Control (CDC).

D. Silver, "Cooperative Pathfinding", Nov. 14, 2015, Eleventh Annual AAAI Conference on Artificial Intelligence and Interactive Digital Entertainment.

J. M. V. Ventura, "Safe and flexible hybrid control architecture for the navigation in formation of a group of vehicles", Oct. 26, 2015, Ph.D. Thesis, Universite Blaise Pascal—Clermont-Ferrand II, Clermont-Ferrand, France.

Wikimedia Foundation, "Robotics/Navigation/Trajectory Planning", Nov. 4, 2016, available via the Internet at en.wikibooks.org/w/index.php?title=Robotics/Navigation/Trajectory_Planning&oldid=3142754 (last visited Dec. 20, 2016).

R. Yehoshua, "Sample based motion planning—Roadmaps and RRTs", Jan. 11, 2014, available via the Internet at u.cs.biu.ac.il/~yehoshr1/89-685/Fall2013/TheoryLessons/Lec9-Short.pdf (last visited Oct. 5, 2016).

J. Yu et al., "Planning Optimal Paths for Multiple Robots on Graphs", May 10, 2013, 2013 IEEE International conference on Robotics and Automation (ICRA).

* cited by examiner

MULTI-AGENT COORDINATION UNDER SPARSE NETWORKING

BACKGROUND

One or more robots and/or other actors, such as human actors, can move throughout a space, such as the interior of part or all of a building and/or its surrounding outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems.

Mobile robotic devices can be used in a number of different environments to accomplish a variety of tasks. For example, mobile robotic devices can deliver items, such as parts or completed products, within indoor environments, such as warehouses, hospitals and/or data centers. When mobile robotic devices are deployed, they can use one or more possible paths to and from delivery and/or other locations. These paths can be determined using one or more route planning algorithms.

SUMMARY

The present application discloses implementations that relate to a multi agent planning framework for coordination of agents moving within an environment. In environments having multiple agents operating therein, a coordinated path may be generated for each agent such that the paths allow the agents to operate within the environment without running into each other. Coordinated paths may be synchronized to each other such that robotic executing different coordinated paths will be in sync, and will not run into each other. In particular, there may be an overall timeline that each coordinated path is synced to in order for simultaneous execution of multiple coordinated paths by different robotic devices.

In one example, the present application describes method. The method involves receiving, by a first robotic device, a first time-parameterized path for the first robotic device. The method also involves receiving, by the first robotic device, an indication of a second robotic device having a second time-parameterized path that overlaps with the first time-parameterized path at a first location. The method further involves executing, by the first robotic device, a first portion of the first time-parameterized path before reaching the first location, wherein execution of the first portion corresponds to a first rate of progress of the first robotic device along the first time-parameterized path. The method still further involves receiving, by the first robotic device, a communication signal from the second robotic device indicating a second rate of progress of the second robotic device along the second time-parameterized path. The method also involves determining a difference between the first rate of progress and the second rate of progress. And the method still further involves modifying, by the first robotic device, execution of the first time-parameterized path based on the determined difference.

In a second example, a system is described. The system includes a first robotic device and a second robotic device. The first robotic device is configured to receive a first time-parameterized path for the first robotic device. The first robotic device is also configured to receive an indication of a second robotic device having a second time-parameterized path that overlaps with the first time-parameterized path at a first location. The first robotic device is also configured to execute a first portion of the first time-parameterized path before reaching the first location, wherein execution of the first portion corresponds to a first rate of progress of the first robotic device along the first time-parameterized path. The first robotic device is further configured to receive a communication signal from the second robotic device indicating a second rate of progress of the second robotic device along the second time-parameterized path. The first robotic device is still further configured to determine a difference between the first rate of progress and the second rate of progress. And the first robotic device is yet further configured to modify execution of the first time-parameterized path based on the determined difference.

In a third example, a non-transitory computer-readable medium is described. The non-transitory computer-readable medium has instructions stored thereon that, when executed, cause performance of a set of acts. The set of acts includes receiving a first time-parameterized path for the first robotic device. The set of acts also includes receiving an indication of a second robotic device having a second time-parameterized path that overlaps with the first time-parameterized path at a first location. The set of acts further includes executing a first portion of the first time-parameterized path before reaching the first location, wherein execution of the first portion corresponds to a first rate of progress of the first robotic device along the first time-parameterized path. The set of acts still further includes receiving a communication signal from the second robotic device indicating a second rate of progress of the second robotic device along the second time-parameterized path. The set of acts still further includes determining a difference between the first rate of progress and the second rate of progress. And the set of acts also includes modifying execution of the first time-parameterized path based on the determined difference.

In another example, a control system is described. The control system includes means for receiving a first time-parameterized path for the first robotic device. The control system also includes means for receiving an indication of a second robotic device having a second time-parameterized path that overlaps with the first time-parameterized path at a first location. The control system further includes means for executing a first portion of the first time-parameterized path before reaching the first location, wherein execution of the first portion corresponds to a first rate of progress of the first robotic device along the first time-parameterized path. The control system still further includes means for receiving a communication signal from the second robotic device indicating a second rate of progress of the second robotic device along the second time-parameterized path. The control system also includes means for determining a difference between the first rate of progress and the second rate of progress. And the control system further includes means for modifying execution of the first time-parameterized path based on the determined difference.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
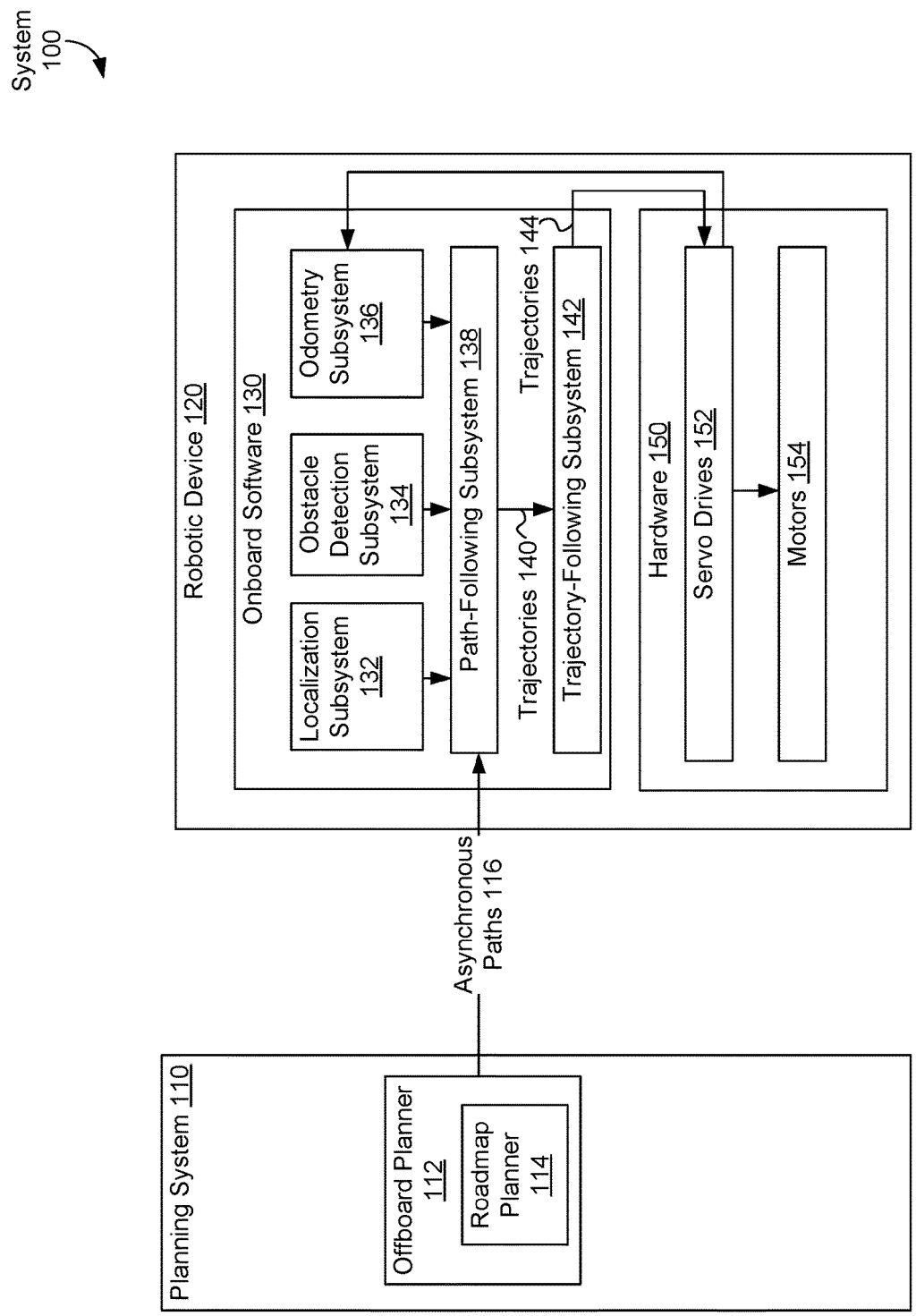
FIG. 1 is a block diagram of a system, in accordance with an example embodiment.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. OVERVIEW

Robotic navigation in an environment such as a warehouse can allow autonomous robotic devices the ability to carry out one or more actions without the need for constant human control. In an environment having multiple robotic devices, the movements of the robotic devices may be coordinated with each other such that they do not run into each other or objects in the environment, for example. In addition, there may be constant communication and/or control of the agents by a centralized management system, to aid in collision avoidance and maintain efficient operation of the agents. Without continuous communication and/or control (i.e., sparse networking), fluctuations or deviations in execution of paths by the agents may result in collisions between agents or the environment, as well as other unintentional operational errors. Some environments, such as large warehouses, may have an issue with connectivity between agents and a centralized management system, due to sparse Wi-Fi or other network coverage. For instance, some warehouses may have limited signal strength in certain areas due to the size of the warehouse, materials of the walls or objects contained in the warehouse, or lack of signal sources or repeaters.

Example embodiments disclosed herein may allow for execution of coordinated paths by multiple agents operating in an environment even where there is limited or disrupted access to a centralized control system. Where one or more agents deviate from scheduled execution of their respective paths, example embodiments may allow agents to continue operating and executing their respective paths without communication or correction from the central planner. Further, the agents may communicate on an ad hoc basis with each other to propagate their respective rates of progress, statuses, errors, deviations, or other information that pertains to execution of their respective paths When a robotic device is given a task, it may also be given a corresponding time-parameterized path, that may include the scheduled locations, timing, speed, orientation of the robotic device, and/or other information pertaining to the robotic device so that it can carry out the task. In some examples, multiple robotic devices may have tasks to carry out in the same environment at the same time, or for some overlapping amount of time. There may be multiple robotic devices moving throughout the environment at the same time, and each robotic device may be given a respective time-parameterized path to follow. And further, the time-parameterized paths may be designed, generated, or otherwise selected such that for any particular point in time, no two robotic devices are scheduled to occupy the same location.

In practice, one or more robotic devices executing their respective time-parameterized paths may move faster or slower than expected, may make an unexpected stop or path deviation, or may otherwise deviate from an expected execution of the time-parameterized path. If the time-parameterized path is thought of as a timeline with a starting point and an ending point, a given robotic device may be ahead of or behind a scheduled execution of an associated time-parameterized path. These differences in execution can cause problems such as a collision between robotic devices, a robotic device getting stuck in a location with nowhere to move, or any number of issues. One way to attempt to solve these problems is by having a centralized planning system communicate with the robotic devices to provide instructions to avoid collisions, avoid dead ends, or situations in which a robotic device runs into a problem.

However, as mentioned above, some environments may not be conducive to communication between a centralized planning and the robotic devices at all times and in all locations within the environment. For instance, a warehouse may have a WiFi router at a location near an office located on one side of the warehouse, but the WiFi signal may not reach all areas of the warehouse. A robotic device may receive instructions, including a time-parameterized path, from a centralized planning system via communication through the WiFi router located near the front office. However, should the time-parameterized path take the robotic device to a location far away from the front office, the centralized planning system may not be able to communicate with the robotic device, and may not be able to provide updated instructions or an alternate time-parameterized path should an error occur.

With these concepts in mind, an example method disclosed herein may involve a first robotic device receiving a first time-parameterized path for the first robotic device. The first time-parameterized path may be received from a centralized planning system (or path planning system), and may be generated, selected, or otherwise created such that it does not conflict with other time-parameterized paths. The first time-parameterized path may be a timeline of positions, areas, segments, or other portions of a path where the first robotic device is scheduled or expected to be at any given time.

The method may also involve the first robotic device receiving an indication of a second robotic device having a second time-parameterized path that overlaps with the first time-parameterized path at a first location. As discussed herein, one time-parameterized path overlapping another time-parameterized path can include any instance where the first path crosses or covers the same area as a second path. Further, two paths may overlap if a swept space of a robotic device corresponding to the first time-parameterized path occupies any space of a second robotic device with a corresponding second time-parameterized path. And further, two paths overlapping may be considered irrespective or a timing element. Embodiments disclosed herein are concerned with an overlap as being any place where a pair of robotic devices could possibly conflict along their respective time-parameterized paths, if one or both of the robotic devices gets off schedule. For instance, an overlap may be any place where the time-invariant path a robotic device is schedule to take through an environment conflicts with a second robotic device's time-invariant path (including the swept area of both robotic devices).

The indication of the second robotic device may correspond to a second robotic device that is expected to follow a second time-parameterized path that will take the second robotic device near the first robotic device. In practice, the first and second robotic devices may be expected to be near each other at or near the first location. And if this first location is in a communication dead zone, a centralized planning system may not be able to provide instructions if the first and/or second robotic device is off schedule.

The method may then involve the first robotic device beginning execution of the first time-parameterized path, by moving to a position that is before the position at which the first time-parameterized path overlaps with the second time-parameterized path. During execution of the first time-parameterized path, the first robotic device may determine its rate of progress by comparing an actual location to a scheduled or expected location based on a given time. For instance, the first time-parameterized path may include the first robotic device moving 10 meters during a first 10 seconds of execution. The first robotic device may actually move 9.5 meters during this time, and may thus be slightly behind schedule. The rate of progress may be measured in units of distance, time, distance/time, or any other metric.

The term "rate of progress" is used herein to refer to any measurement that indicates an amount of progress of a robotic device along a scheduled time-parameterized path. After beginning execution of the first time-parameterized path, the first robotic device may then receive a communication from the second robotic device, indicating a second rate of progress of the second robotic device along the second time-parameterized path.

In an ideal world, time-parameterized paths may be selected such that perfect execution by the robotic devices would result in no errors, collisions, delays, or other problems. The time-parameterized paths may be designed such that the robotic devices move to positions and give each other enough time so that no collisions occur. However, either or both of the first and second robotic devices may have imperfect execution of their time-parameterized paths, by either falling behind schedule or getting ahead of schedule. As such, the difference between the first rate of progress and the second rate of progress will provide a relative difference between the robotic devices. If each robotic device is ahead of or behind schedule by the same amount seconds, there should be a limited risk of collision. However, if one robotic device is behind schedule and the other robotic device is not, there may be a risk of collision or other operational error.

Based on the difference between the first rate of progress and the second rate of progress, the first robotic device may modify its execution of the first time-parameterized path. In some examples, this modification may entail synchronizing the rate of progress, such that any delay present in the second robotic device's execution propagates to the first robotic device, resulting in both robotic devices being delayed by the same amount. Alternatively, either the first or second robotic device may slow down or speed up, stop altogether, take a different route or path, backtrack to a previous position, send an instruction to another robotic device to perform some action, or otherwise alter the execution of a time-parameterized path.

In an environment having three or more robotic devices, the rate of progress of the first and/or second robotic device may be transmitted to other robotic devices, such that any delay in execution by one robotic device is propagated throughout the fleet of robotic devices. In this manner, all or a subset of all the robotic devices operating within the environment can operate without risk of collision or other error, even where a delay in execution by one robotic device makes it deviate from an expected schedule.

II. EXAMPLE SYSTEM DESIGN

FIG. 1 is a block diagram of system 100, in accordance with an example embodiment. System 100 includes planning system 110 and robotic device 120. Planning system 110 can include offboard planner 112 that can coordinate motion of one or more robotic devices operating in an environment. Offboard planner 112 can include roadmap planner 114. Offboard planner 112 and/or roadmap planner 114 can generate one or more asynchronous paths 116 for a robotic device, such as robotic device 120, to follow while operating in an environment.

A roadmap graph, prototype graph, or other roadmap representing an environment, such as prototype graph 300 discussed below in the context of FIG. 3, can be received, determined, or otherwise provided to planning system 110, offboard planner 112 and/or roadmap planner 114. Asynchronous paths 116 can be one or more paths based on the roadmap graph, prototype graph, or other roadmap. For example, if the roadmap graph, prototype graph, or other roadmap has a plurality of edges that connect a plurality of intersections, asynchronous paths 116 can be specified in terms of the plurality of edges and/or the plurality of intersections.

Robotic device(s) 120 can include onboard software 130 and/or hardware 150. Onboard software 130 can include one or more of: localization subsystem 132, obstacle detection subsystem 134, odometry subsystem 136, path-following subsystem 138, and trajectory-following subsystem 142. Localization subsystem 132 can be used to localize a robotic device, that is, determine a location of the robotic device within an environment. Localization subsystem 132 can generate position estimates of the robotic device and/or other objects that can be used to localize the robotic device, assist the robotic device in following a path, such as asynchronous paths 116, and/or assist the robotic device in following a trajectory, such as trajectories 140. Once the position estimates are generated, localization subsystem 132 can provide the position estimates to path-following subsystem 138.

An asynchronous path, or path for short, can be a time-invariant plan or other information indicating how robotic device 120 can travel from a starting point SP to an ending point EP; i.e., an (asynchronous) path does not take time into account. In contrast, a trajectory can include values of a steering angle and of traction motor velocity that robotic device 120 can follow for a planning time interval.

The planning time interval can be a duration of time that a robotic device is guided, or planned to follow a path, route, and/or travel. In some embodiments, the planning time interval can be a predetermined amount of time; e.g., five seconds, one second, 0.2 seconds, or 0.1 seconds. In particular, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 120 can travel from starting point SP to an ending point EP in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 120, and actuator positions of robotic device 120.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 134 can determine whether one or more obstacles are blocking a path and/or a trajectory of robotic device 120. Examples of these obstacles can include, but are not limited to, pallets, objects that may have fallen off a pallet, robotic devices, and human operators working in the environment. If an obstacle is detected, obstacle detection subsystem 134 can provide one or more communications indicating obstacle detection to path-following subsystem 138. The one or more communications indicating obstacle detection can include location information about one or more positions of one or more obstacles detected by obstacle detection subsystem 134 and/or identification information about the one or more obstacles detected by obstacle detection subsystem 134. Odometry subsystem 136 can use data, such as data from servo drives 152, to estimate one or more changes in position of robotic device 120 over time.

Path-following subsystem 138 and/or trajectory-following subsystem 142 can act as a planner aboard robotic device 120. This onboard planner can follow one or more paths, such as asynchronous paths 116, based on position estimates provided by localization subsystem 132.

Path-following subsystem 138 can receive asynchronous paths 116, position estimate inputs from localization subsystem 132, location information about one or more positions of one or more obstacles from obstacle detection subsystem 134, and/or information about one or more changes in position from odometry subsystem 136, and generate one or more trajectories 140 as outputs.

Hardware 150 can include servo drives 152 and/or motors 154. Servo drives 152 can include one or more servo drives. Servo drives 152 can include an electronic amplifier used to power one or more servomechanisms and/or can monitor feedback signals from the servomechanism(s). Servo drives 152 can receive control signals, such as trajectories 144, from onboard software 130, and can provide electric current to the servomechanism(s) to produce motion proportional to the control signals. In some embodiments, servo drives 152 can compare status information received from the servomechanism(s) with an expected status as commanded by trajectories 144. Then, servo drives 152 can adjust a voltage frequency or pulse width of the provided electric current to correct for deviations between received status information and an expected status. In other embodiments, servo drives 152 can provide information, such as the feedback signals and/or location-related information, to onboard software 130.

One or more motors 154 can be part or all of the servomechanism(s) powered by servo drives 152. For example, motors 154 can use the electric current provided by servo drives 152 to generate mechanical force to drive part or all of robotic device 120; e.g., motors 154 can provide force to propel robotic device 120 and/or drive one or more effectors of robotic device 120.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

Figure 2:
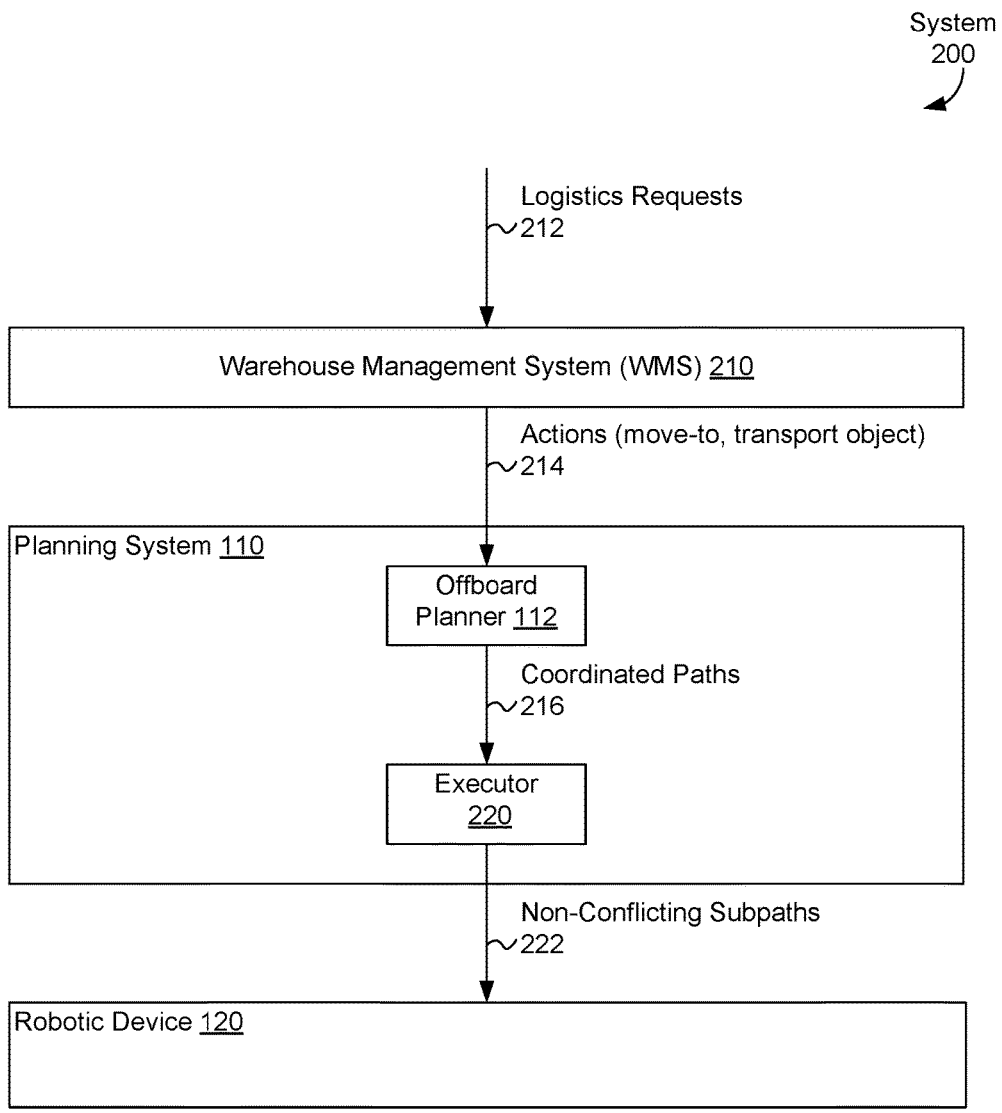
FIG. 2 depicts a system for operating one or more warehouses, in accordance with an example embodiment.

FIG. 2 depicts system 200 for operating one or more warehouses, in accordance with an example embodiment. System 200 includes warehouse management system 210, planning system 110, and robotic device 120. Warehouse management system 210 can receive one or more logistics requests 212 associated with the warehouse; e.g., requests to store one or more items in the warehouse and/or requests to ship one or more items from the warehouse. Warehouse management system 210 can translate logistics requests 212 into one or more actions 214, where actions 214 can include, but are not limited to, a "move-to" action to move one or more designated agents to one or more designated locations, and a "transport" action to carry one or more items to one or more designated locations. In some examples, actions 214 can be go-to commands of the form {agent ID, destination}, but other actions are possible such as move pallet. These are typically decomposable into move-to commands, however (move to pick location, move to place location).

Planning system 110 includes offboard planner 112 and executor 220. Offboard planner 112 can receive actions 214 as inputs and generate one or more coordinated paths 216 for one or more agents operating in a warehouse; e.g., multiple robotic devices, to carry out actions 214. Coordinated paths 216 can be part of a coordinated action plan for all agents in the warehouse to fulfill logistics requests 212. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 220 can receive coordinated paths 216 and generate non-conflicting sub-paths 222 to direct robotic device 120 in accomplishing its part of the coordinated action plan to carry out actions 214 to fulfill logistics requests 212.

As illustrated above in FIG. 2, planning system 110, which includes offboard planner 112 and executor 220, can communicate with robotic device 120. In some embodiments, the robotic device can be a fork truck, such as any OSHA class 1 or class 3 powered industrial truck. In other embodiments, planning system 110 can include software that executes using one or more networked computing devices located in the "cloud" (e.g., one or more networked computing devices) and/or located somewhere on a premises co-located with robotic device 120.

Figure 3:
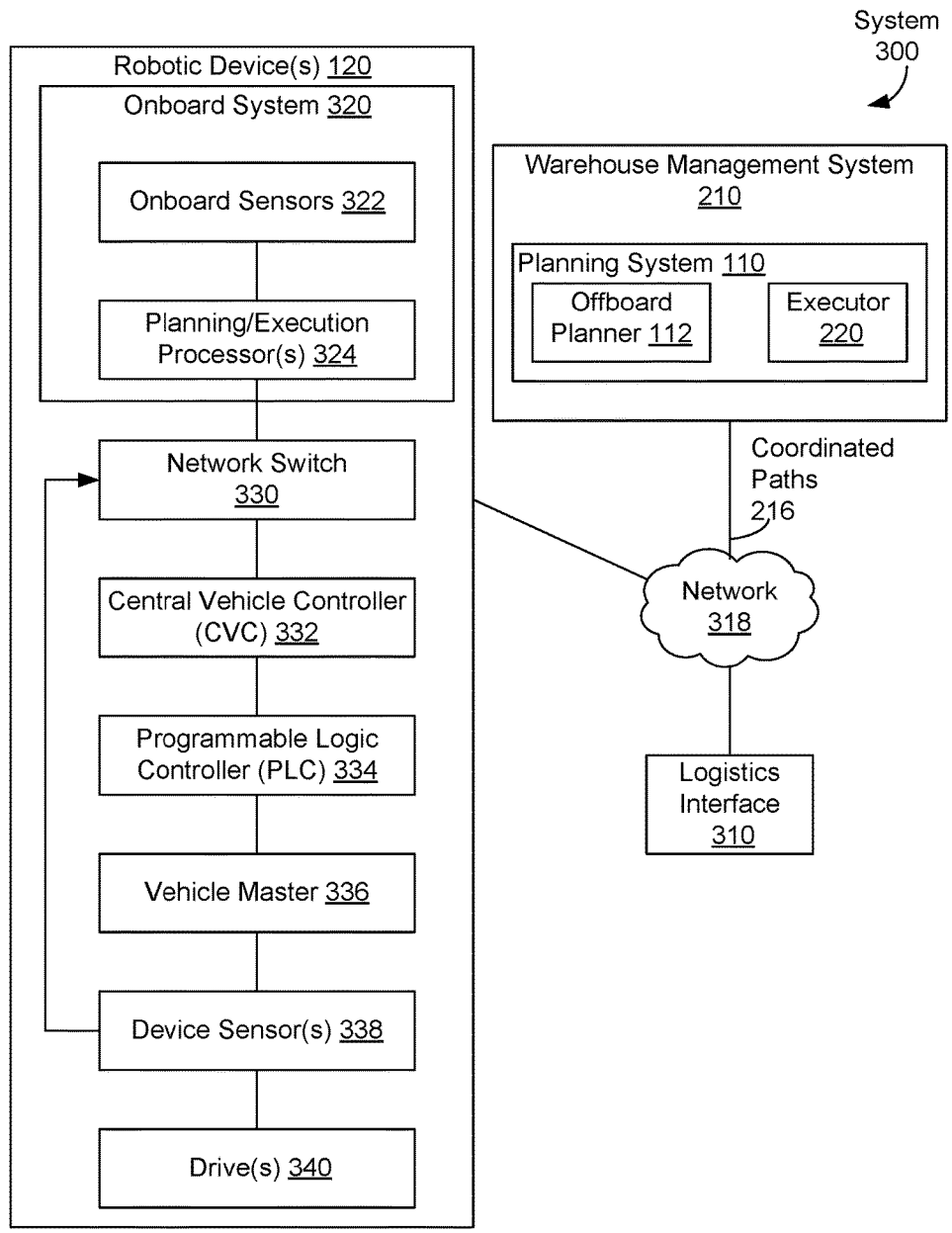
FIG. 3 illustrates a system, in accordance with an example embodiment.

FIG. 3 illustrates a system 300 that includes logistics interface 310, warehouse management system 210, and one or more robotic devices 120 connected using network 318, in accordance with an example embodiment. Logistics interface 310 can provide inventory task instructions to warehouse management system 210 via network 318 regarding movement of objects, such as pallets, and/or robotic devices to warehouse management system 210. An example inventory task can be to bring pallet A containing items of type B to location C.

Warehouse management system 210 can receive the inventory task instructions from logistics interface 310 and generate one or more task/mission instructions (e.g., an instruction to robotic device A to move pallet B from location C to location D) and/or plans for controlling robotic device(s) 120 to carry out the inventory task instructions. The task/mission instructions and/or plans can include information about one or more paths and/or one or more trajectories, where the task/mission instruction(s), plan(s), path(s) and trajectory/trajectories are generated by planning system 110 of warehouse management system 210 using the techniques discussed in the context of FIGS. 1, 2, and 6-7

For example, warehouse management system 210 can be a centralized control service running on and storing data using one or more computing devices; e.g., server computing devices. To perform these tasks, warehouse management system 210 can include WMS middleware and can provide a user interface to provide access to tools for monitoring and managing system 300. The WMS middleware and/or other components of warehouse management system 210 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 210 can provide one or more user interface functions for system 300, including, but not limited to: monitoring of robotic device(s) 120, e.g., presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 120; and reviewing, updating, deletion, and/or insertion of data related to one or more warehouse maps, pallets, networks, and/or planning systems (e.g., planning system 110, warehouse management system 210, and/or logistics interface 310).

In some embodiments, warehouse management system 210 can route communications between logistics interface 310 and robotic device(s) 120 and between two or more of robotic device(s) 120 and manage one or more onboard systems, such as onboard system 320 aboard one or more of robotic device(s) 120. In other embodiments, warehouse management system 210 can store, generate, read, write, update, and/or delete data related to system 300, such as, but not limited to: data regarding completion of a task/mission instruction by one or more of robotic device(s) 120; data regarding locations and/or poses of some or all of robotic device(s) 120, including data indicating a location where a robotic device was initialized/booted; data related to one or more audit trails for human actions, incident analysis, and/or debugging; and data for state tracking. In other embodiments, warehouse management system 210 can include a central message router/persistence manager that communicates with robotic device(s) 120 and one or more adapters. Each of the one or more adapters can provide access to data and/or communications of system 300 available to warehouse management system 210, and can include, but are not limited, to: a user interface service adapter for the above-mentioned user interface, a web content service adapter enabling World Wide Web (WWW)/Internet access to information about system 300, a message proxy adapter and/or a WMS adapter to act as intermediaries between communications between APIs and/or the WMS.

FIG. 3 shows that each of the one or more robotic devices 120 can include one or more of: onboard system 320, network switch 330, vehicle controller 332, programmable logic controller (PLC) 334, one or more device sensors 338, and one or more drives 340.

Onboard system 320 can be a computation and sensor package for robotic planning configured for installation into and use with robotic device 120, where onboard system 320 can include onboard sensors 322 and one or more planning/execution processors 324. FIG. 3 also shows that onboard system 320 is configured to use network switch 330 at least to communicate with planning system 110 (via network 318), with device sensors 338, and/or with one or more actuators of robotic device 120.

Onboard system 320 can be responsible for one or more of: localization of robotic device 120, generation of local trajectories to carry out plans and/or travel along paths and/or trajectories provided by warehouse management system 210, generation of commands to drives 340 to follow one or more (local) trajectories, generation of commands to control actuator(s) of robotic device 120, and reporting pose, status and/or other information to warehouse management system 210.

Onboard sensors 322 can include one or more navigation lasers, laser scanners, cameras, and/or other sensors for navigating and/or controlling onboard system 320. For example, a robotic device of robotic device(s) 120 can include one or more laser scanners, such as one or more laser scanners provided by SICK AG of Waldkirch, Germany, HOKUYO AUTOMATIC CO. LTD of Osaka, Japan, or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 324 can include one or more computer processors connected at least to onboard sensors 322. Planning/execution processor(s) 324 can read data from onboard sensors 322, generate local trajectories and/or commands to drive(s) 340 to move robotic device 120, and communicate with warehouse management system 210. A local trajectory can be a trajectory where robotic device 120 starts at a starting pose and reaches an ending pose at some time. In some examples, the starting pose can be implicitly specified; e.g., the starting pose can be a current pose of robotic device 120 and so the local trajectory be based on an assumption that its starting pose is the current pose of robotic device 120.

Planning/execution processor(s) 324 can utilize a component framework. The component framework can be a multi-threaded job scheduling and message passing system built on software libraries for input/output (I/O) and signaling configured to provide a consistent asynchronous model of robotic device 120, such as the "boost::asio" and "boost::signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 120 for vehicle initialization, vehicle commanding and fault handling. The state machine component can use a deterministic finite automaton or other state machine to manage the state of the robotic device.

The localization component can read data from vehicle sensors and integrate prior state information of robotic device 120 to determine a pose of robotic device 120. The pose can be determined relative to one or more detected landmarks/points of interest, such as pallets or other objects. The planning component can receive one or more objectives from warehouse management system 210 and determine a local trajectory for robotic device 120 to achieve those objectives. In some embodiments, the local trajectory can be a short-term trajectory that robotic device 120 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions that are then relayed to drives 340 that control a traction motor and other actuators for robotic device 120.

Network switch 330 can enable communications for robotic device(s) 120. These communications can include, but are not limited to, communications between onboard system 320 and the rest of robotic device 120; e.g., device sensors 338 and drives 340, and communications with warehouse management system 210 via network 318. For example, network switch 330 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 120 and planning system 110 can include remote procedure calls (RPCs). The remote procedure calls can allow invocation of software procedures, methods, and/or functions resident on one or more of robotic device(s) 120 by software of planning system 110 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 332 and/or programmable logic controller 334 can provide electrical and sensor management functionality for robotic device(s) 120. The electrical and sensor management functionality can include, but is not limited to, functionality for electrical load control, lighting control, sensor control, sensor and/or switch signal processing, and power management. Vehicle master 336 can provide functionality for controlling one or more actuators, such as lift devices, of robotic device(s) 320.

Device sensor(s) 338 can include one or more sensors that can provide data related to controlling and/or operating robotic device(s) 120. The data can provide information about an environment about robotic device(s) 120, such as but not limited to, localization information, position estimates, and mapping data. For example, device sensor(s) 338 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 340 can include one or more drive controllers and/or actuators that provide functionality for moving robotic device(s) 120. The drive controllers can direct the drive actuators to control movement of robotic device(s) 120. The drive actuators can include one or more traction motors, electric drives, hydraulic drives, and pneumatic drives.

Figure 4:
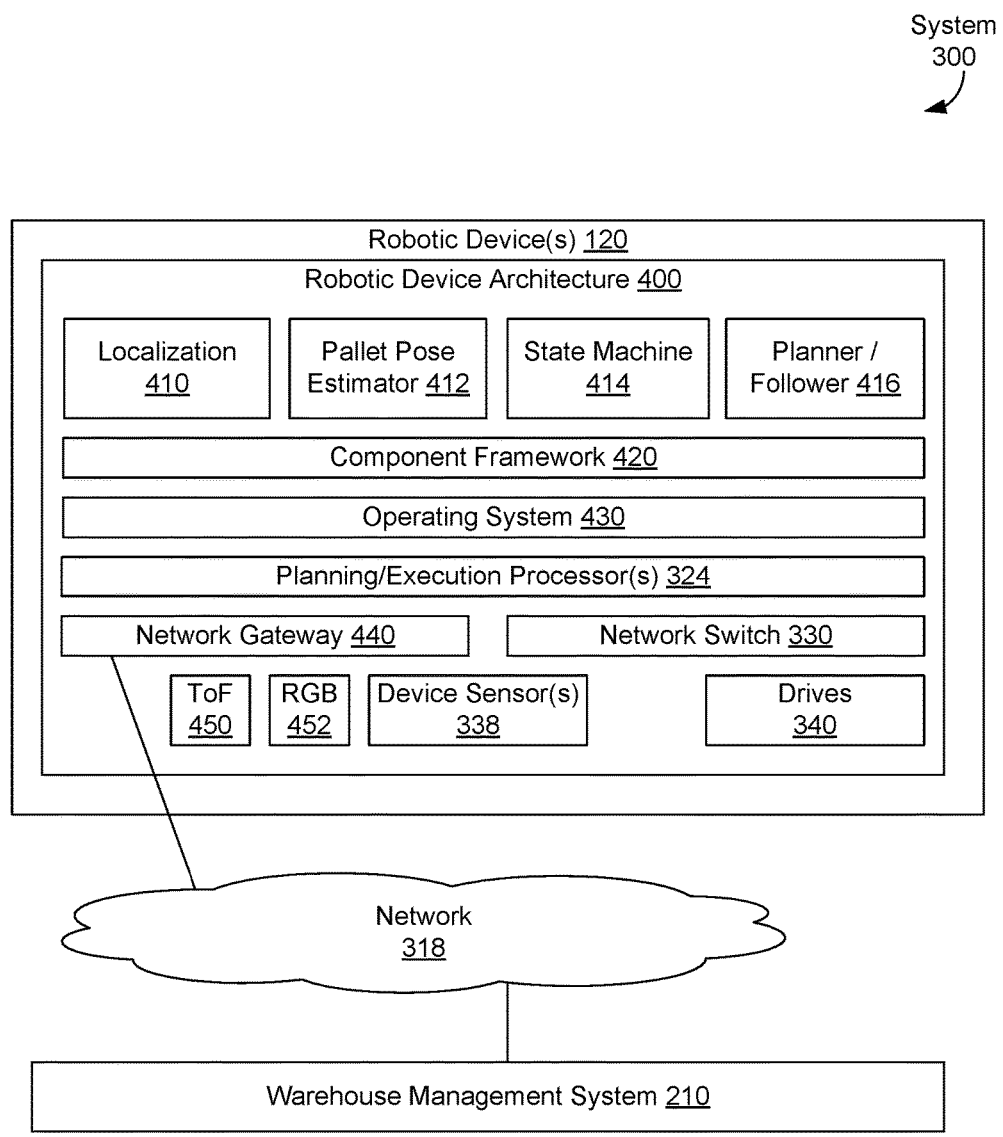
FIG. 4 illustrates a robotic device architecture for one or more robotic devices, in accordance with an example embodiment.
Figure 5:
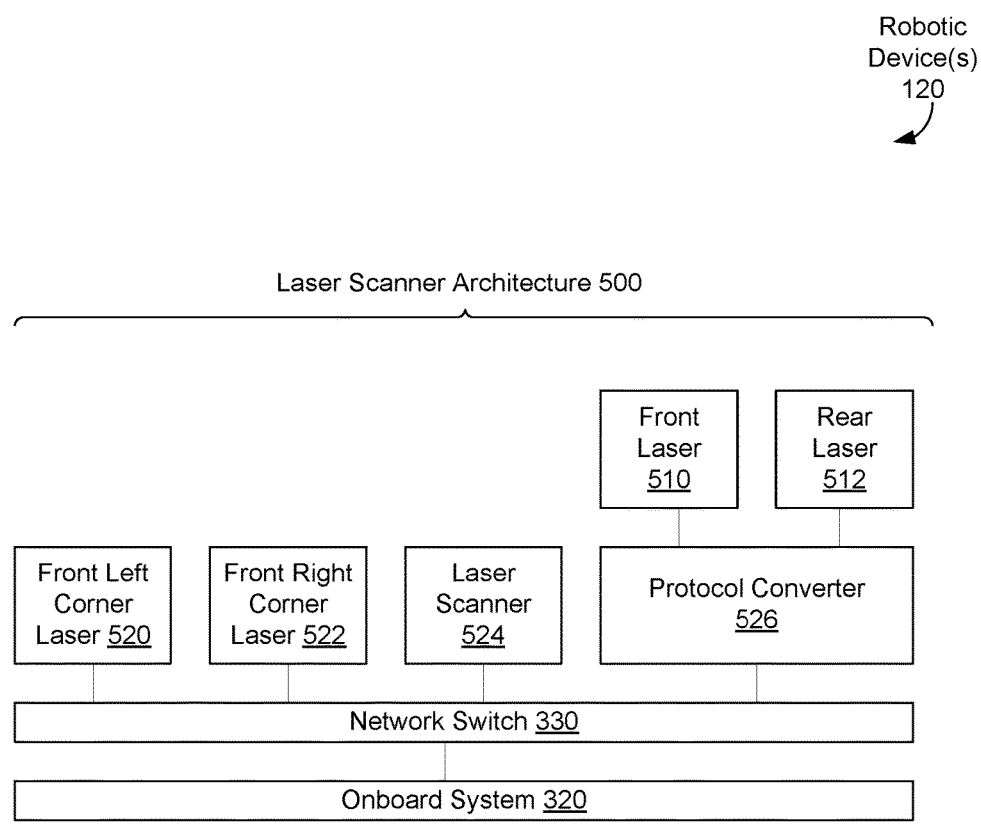
FIG. 5 illustrates a laser scanner architecture for one or more robotic devices, in accordance with an example embodiment.

FIG. 4 illustrates robotic device architecture 400 of robotic device(s) 120, in accordance with an example embodiment. Robotic device architecture 400 of robotic device(s) 120 can include software. The software can include software for localization 410, software for a pallet pose estimator 412, software related to state machine 414, software for planner follower 416, software for component framework 420 and software for operating system 430. The software can be executed by one or more hardware planning/execution processors 324. Communications between robotic device(s) 120 and other devices can be carried out using network gateway 440 and/or network switch 330. For example, network gateway 440 can be used for wireless communications with and within a robotic device of robotic device(s) 120 and network switch 330 can be used for wireline communications with and within a robotic device of robotic device(s) 120. Robotic device architecture 400 also includes additional hardware such as device sensor(s) 338 and drive(s) 340 discussed above in the context of FIG. 3. In some embodiments, robotic device architecture 400 can include one or more cameras, including but not limited to, ToF camera 450 and RGB camera 452, where the one or more cameras can include one or more still cameras and/or one or more video cameras FIG. 5 illustrates laser scanner architecture 500 for robotic device(s) 120, in accordance with an example embodiment. In some embodiments, some or all of device sensor(s) 338 can be lasers and laser scanners illustrated by laser scanner architecture 500.

Laser scanner architecture 500 can include lasers 510, 512, 520, 522, laser scanner 524, protocol converter 526, network switch 330, and onboard system 320. Lasers 510, 512, 520, and 522 can be located at fixed positions of robotic device(s) 120; for example, laser 510 can be located at the front of a robotic device, laser 512 can be located at the rear of the robotic device, laser 520 can be located at a front left corner of the robotic device, and laser 522 can be located at a front right corner of the robotic device. Lasers 510, 512, 520, 522, and/or laser scanner 524 can provide information to localize the robotic device within an environment. In some embodiments, lasers 510, 512, 520, 522, and/or laser scanner 524 can emit light that is reflected off of one or more reflectors—the reflected light can be detected by one or more laser sensors, and the robotic device can be localized within the environment based on a duration of time taken to detect the reflected light. In particular of these embodiments, some or all of lasers 510, 512, 520, 522, and/or laser scanner 524 can include one or more laser sensors for detecting reflected laser light. Then, some or all of lasers 510, 512, 520, 522, and/or laser scanner 524 can generate data, including but not limited to, data related to a laser (e.g., maintenance data for the laser), data related to light emitted by the laser, and data related to one or more durations of time taken to detect reflected laser light by the laser sensor(s).

As illustrated in FIG. 5, some lasers, such as lasers 520, 522, and laser scanner 524 can be directly connected to network switch 330, while other lasers, such as lasers 510, 512, can be connected to network switch 330 via protocol converter 526. Protocol converter 526 can convert a communications protocol used by a laser, such as laser 510 and/or 512, to a communications protocol used by network switch 330; e.g., convert from a communications protocol based on RS-422 to a communications protocol based on Ethernet. Then, lasers 510, 512, 520, 522, and laser scanner 524 can send data to and receive commands from onboard system 320 via network switch 330 and perhaps protocol converter 526.

In some embodiments, robotic device(s) 120 can be subject to one or more failure conditions. Examples of those failure conditions and related recovery strategies are described in Table 2 below.

TABLE 1

| Name | Summary | Recovery Strategy |
|---|---|---|
| Stale Localization | Localization system is unable to determine robotic device pose and/or localization certainty estimate has exceeded bounds. | Robotic device will halt and notify human operator. The operator can intervene by manually driving robotic device to a location for re-localization and reengaging. |
| Trajectory Following | Trajectory following error exceeds threshold. | Robotic device will halt and attempt to restart trajectory following automatically. If system fails twice in a row then human operator will be notified. The operator can intervene by manually driving robotic device back onto roadmap. |
| No Safe Trajectory | Due to obstacle proximity, the trajectory planner cannot find a safe trajectory that would keep the robotic device a safe distance from known obstacles. | Robotic device will halt and notify human operator. The operator can intervene by manually driving robotic device around obstacle. |
| Hardware Fault | Steering/traction drive fault or other low-level hardware I/O fault condition | Robotic device will halt and notify human operator. The operator can power-cycle and manually drive robotic device back onto roadmap. |
| Pallet Detection Failure | Robotic device expected to discover a pallet at commanded location; no pallet was found | Robotic device will send message to a control service that includes sensor data relative to where the pallet was expected to be discovered. The control service will notify human operator and optionally may send pallet pose information manually. |
| Pallet Pose Estimation Failure | Robotic device could not determine pose of pallet relative to robotic device at high confidence. | Robotic device will send message to a control service that includes sensor data relative to where the pallet was expected. The control service will notify |

TABLE 1-continued

| Name | Summary | Recovery Strategy |
|------|---------|-------------------|
|      |         | human operator and send pallet pose information manually. |

III. EXAMPLE COMPUTING DEVICE ARCHITECTURE

Figure 6A:
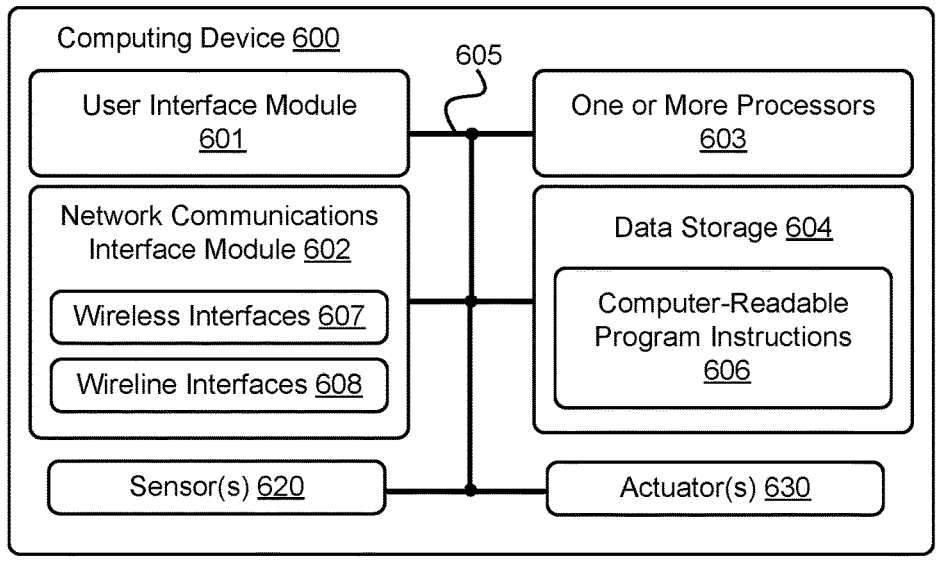
FIG. 6A is a functional block diagram of an example computing device, in accordance with an example embodiment.

FIG. 6A is a functional block diagram of computing device 600 (e.g., system, in accordance with an example embodiment. In particular, computing device 600 shown in FIG. 6A can be configured to perform at least one function related to one or more of: planning system 110, offboard planner 112, roadmap planner 114, robotic device 120, onboard software 130, hardware 150, system 200, warehouse management system 210, executor 220, logistics interface 310, network 318, onboard system 320, onboard sensors 322, planning/execution processors 324, network switch 330, central vehicle controller 332, programmable logic controller 334, vehicle master 336, device sensors 338, drives 340, robotic device architecture 400, laser scanner architecture 500, and method 1000. Computing device 600 may include a user interface module 601, a network-communication interface module 602, one or more processors 603, data storage 604, one or more sensors 620, and one or more actuators 630, all of which may be linked together via a system bus, network, or other connection mechanism 605. In some embodiments, computing device 600 can be configured to act as part or all of a warehouse control system.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a trackball, a joystick, a camera, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices.

Network-communications interface module 602 can include one or more wireless interfaces 607 and/or one or more wireline interfaces 608 that are configurable to communicate via a network. Wireless interfaces 607 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Processors 603 can include one or more general purpose processors, and/or one or more special purpose processors (e.g., digital signal processors, graphics processing units, application specific integrated circuits, etc.). Processors 603 can be configured to execute computer-readable program instructions 606 that are contained in the data storage 604 and/or other instructions as described herein.

Data storage 604 can include one or more computer-readable storage media that can be read and/or accessed by at least one of processors 603. The one or more computer-readable storage media can include volatile and/or non-volatile storage components, such as optical, magnetic, organic or other memory or disc storage, which can be integrated in whole or in part with at least one of processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606 and perhaps additional data. In some embodiments, data storage 604 can additionally include storage required to perform at least part of the herein-described methods and techniques and/or at least part of the functionality of the devices and networks.

In some embodiments, computing device 600 can include one or more sensors 620. Sensor(s) 620 can be configured to measure conditions in an environment for computing device 600 and provide data about that environment; e.g., environment 100. For example, sensor(s) 620 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 600, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 600, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about the computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 620 are possible as well.

Computing device 600 can include one or more actuators 630 that enable computing device 600 to initiate movement. For example, actuator(s) 630 can include or be incorporated with robotic joints connecting robotic limbs to a robotic body. For example, actuator(s) 630 can include respective robotic hip and robotic shoulder joints connecting respective robotic legs and arms to the robotic body. Further, the actuator(s) 630 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 630 can include respective robotic ankle joints connecting the robotic legs to robotic feet and respective robotic wrist joints connecting the robotic arms to robotic hands. In addition, actuator(s) 630 can include motors for moving the robotic limbs. As such, the actuator(s) 630 can enable mobility of computing device 600. Many other examples of actuator(s) 630 are possible as well.

Figure 6B:
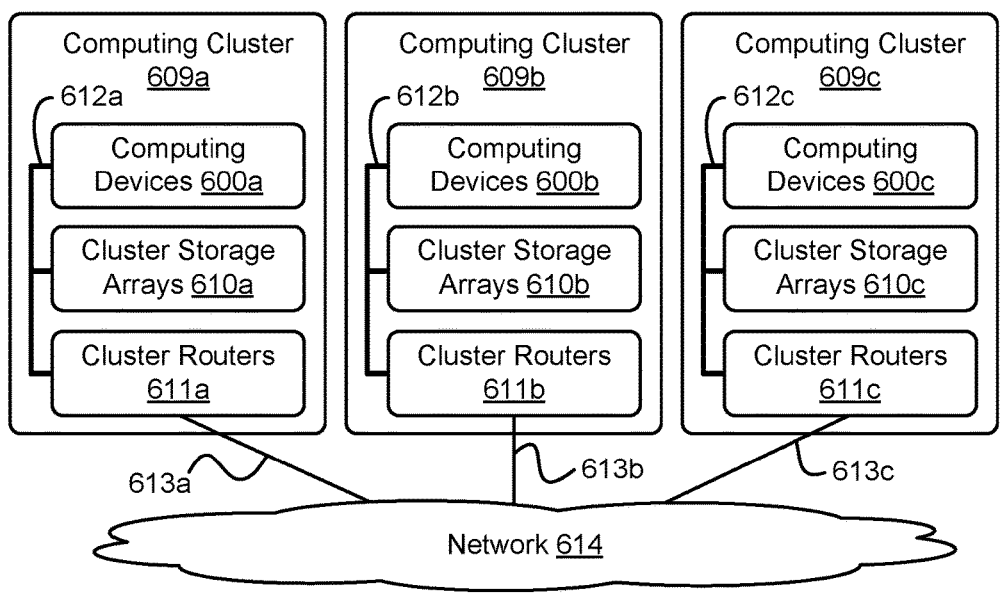
FIG. 6B depicts a network of computing clusters arranged as a cloud-based server system, in accordance with an example embodiment.

FIG. 6B depicts a network 614 of computing clusters 609a, 609b, 609c arranged as a cloud-based server system in accordance with an example embodiment. Computing clusters 609a, 609b, 609c can be cloud-based devices that store program logic and/or data of cloud-based applications and/or services; e.g., perform at least one function related to one or more of: planning system 110, offboard planner 112, roadmap planner 114, robotic device 120, onboard software 130, hardware 150, system 200, warehouse management system 210, executor 220, logistics interface 310, network 36, onboard system 320, onboard sensors 322, planning/execution processors 324, network switch 330, central vehicle controller 332, programmable logic controller 334, vehicle master 336, device sensors 338, drives 340, robotic device architecture 400, laser scanner architecture 500, and method 1000.

In some embodiments, computing clusters 609a, 609b, 609c can be a single computing device residing in a single computing center. In other embodiments, computing clusters 609a, 609b, 609c can include multiple computing devices in a single computing center, or even multiple computing devices located in multiple computing centers located in diverse geographic locations. For example, FIG. 6B depicts each of computing clusters 609a, 609b, 609c residing in different physical locations.

In some embodiments, data and services at computing clusters 609a, 609b, 609c can be encoded as computer readable information stored in non-transitory, tangible computer readable media (or computer readable storage media) and accessible by other computing devices. In some embodiments, computing clusters 609a, 609b, 609c can be stored on a single disk drive or other tangible storage media, or can be implemented on multiple disk drives or other tangible storage media located at one or more diverse geographic locations.

FIG. 6B depicts a cloud-based server system in accordance with an example embodiment. In FIG. 6B, functionality of a planning system can be distributed among three computing clusters 609a, 609b, and 609c. Computing cluster 609a can include one or more computing devices 600a, cluster storage arrays 610a, and cluster routers 611a connected by a local cluster network 612a. Similarly, computing cluster 609b can include one or more computing devices 600b, cluster storage arrays 610b, and cluster routers 611b connected by a local cluster network 612b. Likewise, computing cluster 609c can include one or more computing devices 600c, cluster storage arrays 610c, and cluster routers 611c connected by a local cluster network 612c.

In some embodiments, each of the computing clusters 609a, 609b, and 609c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609a, for example, computing devices 600a can be configured to perform various computing tasks of a planning system, a robotic device, and/or a computing device. In one embodiment, the various functionalities of a planning system, a robotic device, and/or a computing device can be distributed among one or more computing devices 600a, 600b, and 600c. Computing devices 600b and 600c in respective computing clusters 609b and 609c can be configured similarly to computing devices 600a in computing cluster 609a. On the other hand, in some embodiments, computing devices 600a, 600b, and 600c can be configured to perform different functions.

In some embodiments, computing tasks and stored data associated with a planning system, a robotic device, and/or a computing device can be distributed across computing devices 600a, 600b, and 600c based at least in part on the processing requirements of a roadmap editor, single agent planning software, multiple agent planning software, a routing computing device, and/or a computing device, the processing capabilities of computing devices 600a, 600b, and 600c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 610a, 610b, and 610c of the computing clusters 609a, 609b, and 609c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a planning system, a robotic device, and/or a computing device can be distributed across computing devices 600a, 600b, and 600c of computing clusters 609a, 609b, and 609c, various active portions and/or backup portions of these components can be distributed across cluster storage arrays 610a, 610b, and 610c. For example, some cluster storage arrays can be configured to store one portion of the data of a planning system, a robotic device, and/or a computing device can, while other cluster storage arrays can store other portion(s) of data of a planning system, a robotic device, and/or a computing device. Additionally, some cluster storage arrays can be configured to store backup versions of data stored in other cluster storage arrays.

The cluster routers 611a, 611b, and 611c in computing clusters 609a, 609b, and 609c can include networking equipment configured to provide internal and external communications for the computing clusters. For example, the cluster routers 611a in computing cluster 609a can include one or more internet switching and routing devices configured to provide (i) local area network communications between the computing devices 600a and the cluster storage arrays 610a via the local cluster network 612a, and (ii) wide area network communications between the computing cluster 609a and the computing clusters 609b and 609c via the wide area network connection 613a to network 614. Cluster routers 611b and 611c can include network equipment similar to the cluster routers 611a, and cluster routers 611b and 611c can perform similar networking functions for computing clusters 609b and 609b that cluster routers 611a perform for computing cluster 609a.

In some embodiments, the configuration of the cluster routers 611a, 611b, and 611c can be based at least in part on the data communication requirements of the computing devices and cluster storage arrays, the data communications capabilities of the network equipment in the cluster routers 611a, 611b, and 611c, the latency and throughput of local networks 612a, 612b, 612c, the latency, throughput, and cost of wide area network links 613a, 613b, and 613c, and/or other factors that can contribute to the cost, speed, fault-tolerance, resiliency, efficiency and/or other design criteria of the moderation system architecture.

IV. EXAMPLE EMBODIMENTS

As noted above, the present disclosure includes implementations that relate to a multi agent planning framework for coordination of agents moving within an environment, in particular an environment that has areas in which communication between robotic devices and a central planning system is weak or non-existent.

Figure 7:
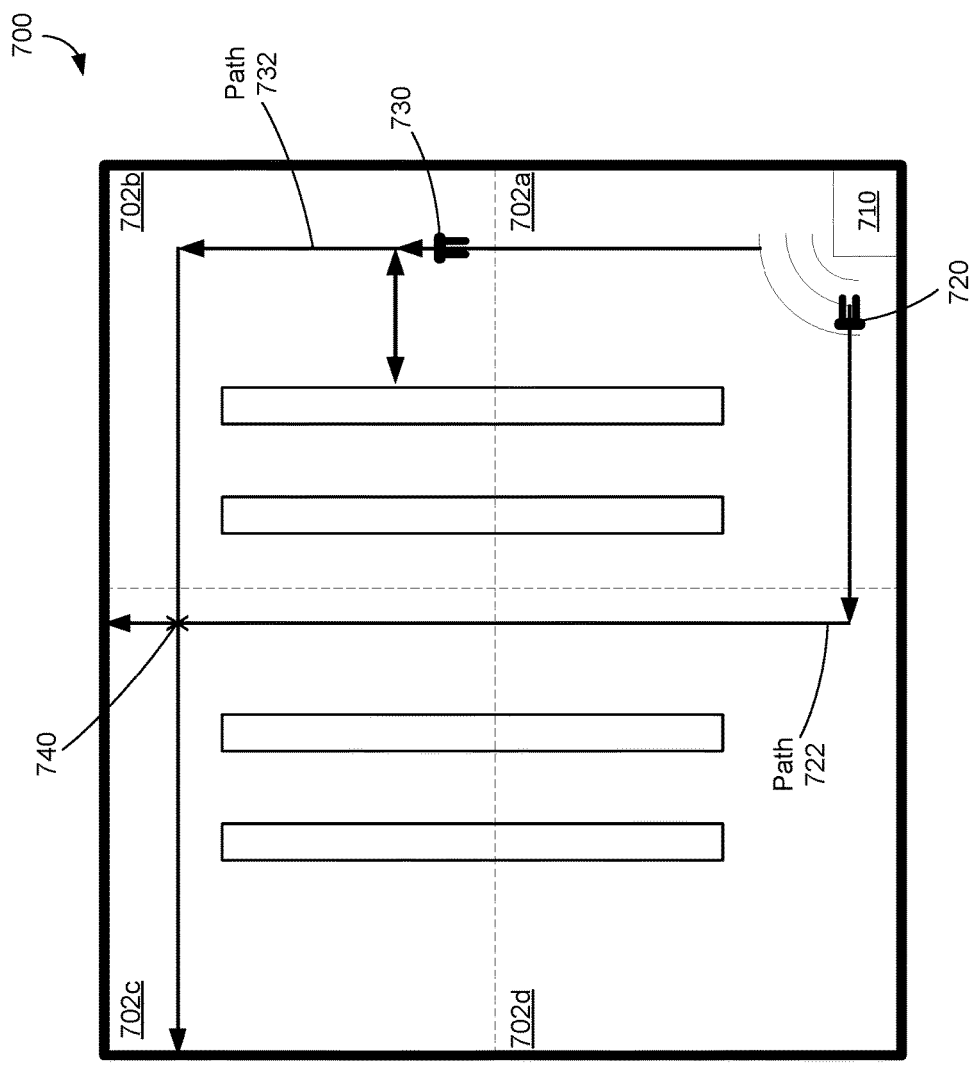
FIG. 7 shows an example environment, in accordance with an example embodiment.
Figure 7:
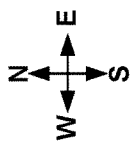

FIG. 7 shows an example environment 700 in which the methods, systems, and devices disclosed herein may operate. Environment 700 may include a plurality of areas 702a-d. In FIG. 7, robotic devices located in area 702a can communicate with path planning system 710. However, due to the size, shape, or other characteristics of environment 700, robotic devices in areas 702b-d cannot communicate with path planning system 710.

FIG. 7 also shows an example system that can operate within environment 700. The system includes first robotic device 720 and second robotic device 730. Robotic devices 720 and 730 may be similar or identical to robotic device 120 described above.

First robotic device 720 may be configured to receive first time-parameterized path 722 for the first robotic device. In FIG. 7, first time-parameterized path 722 is shown as a path for first robotic device 720 to travel west, and then north. First time-parameterized path 722 may also include a timing component, such that first robotic device 720 travels west for 20 seconds, and then travels north for 60 seconds. In other examples, first time-parameterized path 722 may comprise a route, listing of locations and times, or other structured information that can assist first robotic device 720 in carrying out a task. In some examples, first time-parameterized path 722 may be determined, generated, selected, or created by a central planning system or warehouse management system, such as path planning system 710. Each time-parameterized path may be determined such that a robotic device executing the time-parameterized path is scheduled to travel at less than a maximum possible speed. This may allow the robotic device to adjust itself to travel faster than scheduled, such that it can "catch up" if it falls behind. Some examples disclosed herein may refer to a time-parameterized path as a coordinated path.

First time-parameterized path 722 may be received by first robotic device 720 while first robotic device 720 is located in an area of environment 700 that facilitates communication, such as area 702a. In some examples, first time-parameterized path 722 may be received from path planning system 710 directly, while in other examples first time-parameterized path 722 may be received indirectly via one or more intermediary devices or systems. Further, first and/or second time-parameterized paths 722 and 732 may be selected such that they both start and end in an area of environment 700 that facilitates communication. This may provide a level of security in that no matter what happens during execution of the time-parameterized paths, the robotic devices are scheduled to start and end in an area where path planning system 710 can communicate instructions and receive information.

First robotic device 720 may also be configured to receive an indication of a second robotic device having a second time-parameterized path that overlaps with the first time-parameterized path at a first location. FIG. 7 shows second robotic device 730 having second time-parameterized path 732 that overlaps with first time-parameterized path 722 at first position 740. In some examples, the indication of the second robotic device may include information about second robotic device 730. For instance, the indication of the second robotic device may include one or more characteristics of second robotic device 730, such as the type of device and/or size, weight, and shape of an object being carried. The indication may also include information about second time-parameterized path 732 (such as all the location at which second robotic device 730 is scheduled to be, and/or one or more locations where the second time-parameterized path overlaps with the first time-parameterized path). Second time-parameterized path 732 may be similar to first time-parameterized path 722, yet may be specific to second robotic device 730.

First time-parameterized path 722 and second time-parameterized path 732 may overlap at first location 740. FIG. 7 shows that first robotic device 720 is scheduled to travel west and then north through first position 740, and that second robotic device 730 is scheduled to travel north and then west through first position 740. As such, first time-parameterized path 722 and second time-parameterized path 732 overlap at first position 740. Other time-parameterized paths are possible as well, including paths that overlap at two or more positions. In still further examples, two or more time-parameterized paths may overlap in a plurality of consecutive positions, such as where one robotic device is scheduled to travel the same path or a portion of the same path as a second robotic device (e.g., where a first robotic device follows a second robotic device). In some examples, two time-parameterized paths may not share the exact same location, but may overlap nonetheless based on a footprint of the robotic devices scheduled to execute the paths. For instance, the first robotic device may have a wide footprint, and may thus overlap with paths that may run parallel to the first time-parameterized path on either side. In this manner, a first time-parameterized path overlapping with a second time-parameterized path may include the footprint or swept area of one or more robotic devices.

In some examples, first robotic device 720 may be configured to receive second time-parameterized path 732, and based on the received second time-parameterized path, first robotic device 720 may determine first position 740. For instance, first robotic device 720 may compare first time-parameterized path 722 to second time-parameterized path 732 to determine any locations at which the paths overlap (or are near enough that the footprint of the robotic devices may overlap).

In some examples, first position 740 may be in an area of environment that does not facilitate communication between first robotic device 720 and path planning system 710. FIG. 7 shows this case, in which first position 740 is located in area 702*c*, and in which location robotic device 720 cannot communicate with path planning system 710.

First robotic device 720 may also be configured to execute a first portion of first time-parameterized path 722 before reaching first location 740, wherein execution of the first portion corresponds to a first rate of progress of the first robotic device along first time-parameterized path 722. The first portion of first time-parameterized path 722 may be a segment, chunk, or discretized part of the first time-parameterized path that extends from a current position to a later scheduled position. In some examples, the first portion is a portion that first robotic device 720 is expected to travel in a given amount of time, based on one or more characteristics of first robotic device 720 and environment 700. For instance, the first portion may be a distance of first time-parameterized path 722 that first robotic device 720 is expected to travel in five seconds. The actual distance may depend on many factors, such as the grade of the environment, one or more safety or performance factors, or speed, orientation, load, or other characteristic of the robotic device, for example. The first portion of first time-parameterized path 722 may extend up to first position 740 (i.e., the position at which the first and second time-parameterized paths overlap).

Execution of the first portion may correspond to a first rate of progress. FIGS. 8A-D and 9A-D, described below, illustrate a timeline for each robotic device that indicates how far ahead of or behind each robotic device is compared with a coordinated or expected timeline. The difference between the coordinated timeline and the timeline corresponding to the first robotic device 820 may be the first rate of progress. While shown in FIGS. 8-9 as a difference in time, the first rate of progress may be measured in units of distance, time, distance/time, or any other metric. The term "rate of progress" may refer to any measurement indicating an amount of progress of a robotic device along a scheduled time-parameterized path. As such, the first rate of progress may indicate how far along first time-parameterized path 722 that first robotic device 720 has traveled after executing the first portion. The first rate of progress may also indicate an amount of distance, time, or other metric that corresponds to how far first robotic device 720 is ahead of or behind schedule. For instance, a robotic device may be scheduled to travel ten meters during execution of a first portion, but in reality may only travel nine meters. As a result, the robotic device may be behind schedule by one meter (which may also correspond to a two second delay where the robotic device travels at a half meter per second for the first portion).

First robotic device 720 may then be configured to receive a communication signal from second robotic device 730 indicating a second rate of progress of second robotic device 730 along second time-parameterized path 732. One or more of the robotic devices may be configured for communication with other robotic devices, including any type of short range wireless communication (e.g., Bluetooth, ZigBee, Infrared, etc.). In some examples, when first robotic device 720 approaches first position 740, there may be a point at which first robotic device 720 and second robotic device 730 are close enough for signals to be sent between the devices.

The second rate of progress may be similar or identical to the first rate of progress described above. However, the second rate of progress may correspond to a progress of second robotic device 730 along second time-parameterized path 732. In some examples, the second rate of progress may indicate that second robotic device 730 is ahead of or behind schedule (either in distance, time, or some other metric), as compared to the schedule of second time-parameterized path 732.

First robotic device 720 may also be configured to determine a difference between the first rate of progress and the second rate of progress. In an environment where the first and second robotic devices are only able to communicate with each other, the difference in rates of progress may be more significant than an absolute rate of progress compared to a time-parameterized path. This is because if both robotic devices are delayed by the same amount (and thus have the same rate of progress as compared with their respective time-parameterized paths), their paths will still be in sync and no issues should arise. Alternatively, if there is a large difference between the rates of progress, then the respective time-parameterized paths are no longer in sync and issues may arise.

Based on the determined difference between the first and second rates of progress, first robotic device 720 may modify execution of first time-parameterized path 722. In some examples, modifying execution of the first robotic device may include stopping, slowing down, or adding a delay to the movement and/or execution. An example of the first robotic device stopping for a period of time is described below with respect to FIGS. 9A-D. For instance, in a case where first robotic device 720 determines that the difference between the first rate of progress and the second rate of progress is that second robotic device 730 is behind schedule relative to the first robotic device 720 by three seconds, first robotic device 720 may insert a three second pause into its execution in order to sync up with second robotic device 730. The inserted delay may cause first and second robotic device 720 and 730 to have the same resulting rate of progress (within a threshold of similarity), such that both robotic devices are behind schedule by the same or similar amount. Further, instead of inserting a pause, first robotic device 720 may continue executing first time-parameterized path 722 at a relatively slower pace, such that the first and second robotic device's sync up their rates of progress over a span of time.

In other examples, modifying execution of first time-parameterized path 722 may include causing first robotic device 720 to backtrack to a previous position. Some environments may include a hallway, aisle, or other narrow lane in which robotic devices may travel. In these environments, for example, time-parameterized paths for two robotic devices may have the robotic devices travelling down the hallway in opposite directions at or near the same time. If one robotic device is off schedule by more than a threshold amount, a situation may occur in which both robotic devices are in the hallway at the same time, and neither can progress. The first robotic device may modify execution of the first time-parameterized path in these examples by backtracking, reversing, or otherwise travelling backward to a previous position along the first time-parameterized path. If the first robotic device is on schedule, and the second robotic device is behind schedule, and both devices are blocking each other, the first robotic device may determine that it should backtrack so that the second robotic device does not fall even more behind schedule.

In other examples, modifying execution of first time-parameterized path 722 may include causing first robotic device 720 to speed up. For instance, where first robotic device 720 determines that second robotic device 730 is ahead of schedule, or that first robotic device is more behind schedule than second robotic device, first robotic device may speed up execution in order to catch up to second robotic device 730. Alternatively, depending on the relative difference between the first and second rate of progress, and which robotic device is ahead of the other, first robotic device may send an instruction to second robotic device 730 causing it to speed up, slow down, stop, or add a delay to execution of second time-parameterized path 732.

In still other examples, modifying execution of first time-parameterized path 722 may include causing first robotic device 720 to determine an alternate route or path. The alternate route or path may be an alternate time-parameterized path, and may include one or more different positions and corresponding time stamps. As such, the alternate path may cause first robotic device 720 to travel outside the path determined by first time-parameterized path 722. This may be particularly applicable in a case where the second robotic device breaks down and is blocking the path of the first robotic device.

In some examples, first robotic device 720 may determine that the difference between the first rate of progress and the second rate of progress is greater than a threshold temporal padding. And based on this determination, first robotic device 720 may modify the execution of first time-parameterized path 722. For instance, the temporal padding may be considered when the time-parameterized paths are generated, such that adjustment by robotic devices is not necessary for small deviations. If a robotic device falls behind by less than the temporal padding, there may be no need for adjustment. This padding may make it possible for the robotic devices to operate without the constant need for adjustments and synchronization. Where first robotic device 720 determines that the difference between the first rate of progress and the second rate of progress is greater than one second (i.e., the threshold temporal padding), first robotic device 720 may modify execution of first time-parameterized path 722. However, if the difference is less than one second, first robotic device 720 may take no action.

Further, the concept of a temporal (or spatial) buffer can apply to one or more other examples disclosed herein.

First robotic device 720 may further be configured sending a communication signal to a third robotic device. The communication signal may indicate the rate of progress of first robotic device 720 as well as second robotic device 730. Further, first robotic device may transmit first time-parameterized path 722, second time-parameterized 732, and/or any other information related to the paths, progress, delays, or other characteristics of the first and/or second robotic device.

In some examples, first robotic device 720 may modify execution of first time-parameterized path 722, and subsequently determine a modified first rate of progress. First robotic device 720 may then send a communication signal to a third robotic device indicating any or all of the first rate of progress, the modified first rate of progress, and the second rate of progress. Further, the communication signal may indicate any correction, delay, modification, or other change made by first robotic device 720 and/or second robotic device 730 in response to the difference between the first rate of progress and the second rate of progress.

First robotic device 720 may further be configured to report to path planning system 710 the rate of progress of one or more robotic devices, any modification to one or more robotic devices, or any other information concerning the time-parameterized paths and robotic device. The reporting may occur after first robotic device 720 passes first location 740 and enters a region or area with connectivity to path planning system 710 (e.g., area 702a).

In some examples, a predetermined connectivity map of the environment may be used. The predetermined connectivity map may provide a map listing the areas in which communication between the path planning system and a robotic device is possible, as well as the areas where communication is not possible or is not reliable. This map may be used to determine the starting and/or ending locations for one or more time-parameterized paths, as well as to report the second rate of progress of the second robotic device to the path planning system after the first robotic device passes the first location and enters a region with connectivity to the path planning system.

V. EXAMPLE SCENARIOS

Figure 8A:
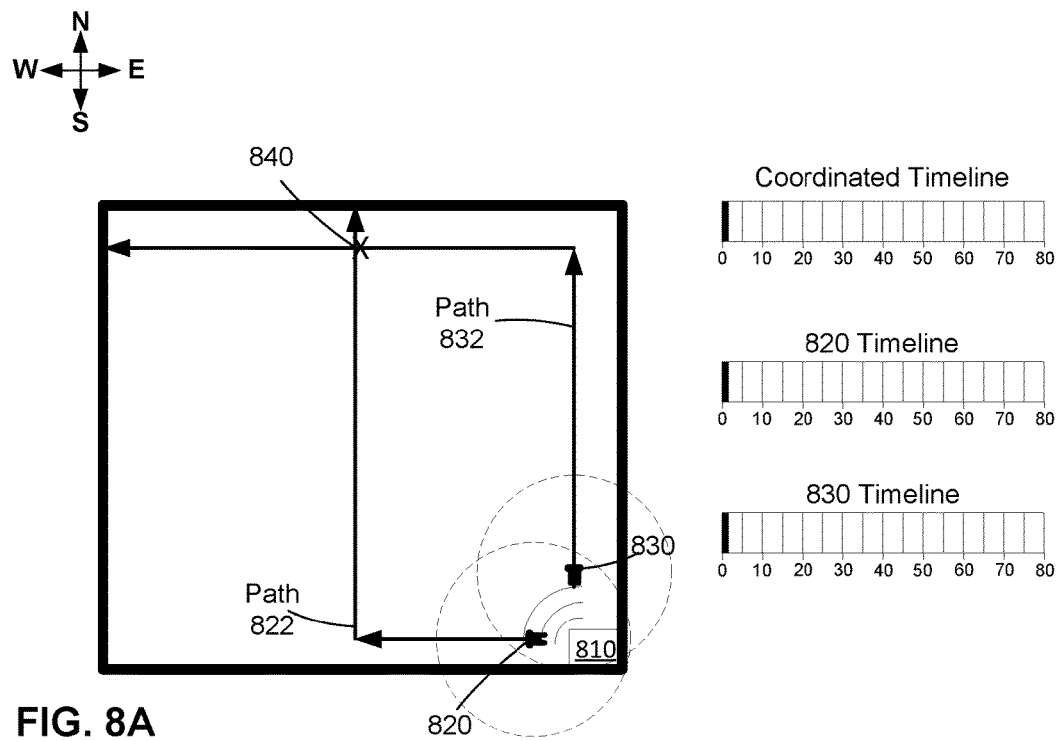
FIGS. 8A-D illustrate an example sequence of four instances in time during execution of an embodiment of the present disclosure.

FIGS. 8A-D illustrate a set of four instances in time during execution of an example embodiment, under ideal conditions. FIG. 8A illustrates a first point in time, during which first robotic device 820 and second robotic device 830 are located near path planning system 810. Each robotic device is shown with a dashed-line circle representing an area in which the robotic device can communicate with another robotic device or system. In FIGS. 8 and 9, the dashed-line circles surrounding each robotic device correspond to a distance for which short range communications can be made.

In FIG. 8A, each robotic device receives a respective time-parameterized path 822 and 832. FIG. 8A also illustrates a coordinated timeline, and two timelines corresponding to first robotic device 820 and second robotic device 830 respectively. The coordinated timeline may be a global or universal timeline, that corresponds to an ideal or expected timeline. In FIGS. 8A-D, time-parameterized paths 822 and 832 begin at the same time, and the timelines are all shown as beginning at the same time. As such, first robotic device 820 and second robotic device 830 have a coordinated timeline. However, some examples may include time-parameterized paths that begin or end at different points in time, and are offset from each other. In these examples, there may be different coordinated timelines corresponding to each robotic device. These different coordinated timelines can be compared with the actual timeline for each robotic device to determine how far off each robotic device is.

FIG. 8A also illustrates that time-parameterized paths 822 and 832 overlap at position 840. As such, first robotic device 820 may receive an indication of second robotic device 830, where the indication can be used to determine where first robotic device 820 can expect to meet second robotic device 830 (i.e., at or near position 840).

Figure 8B:
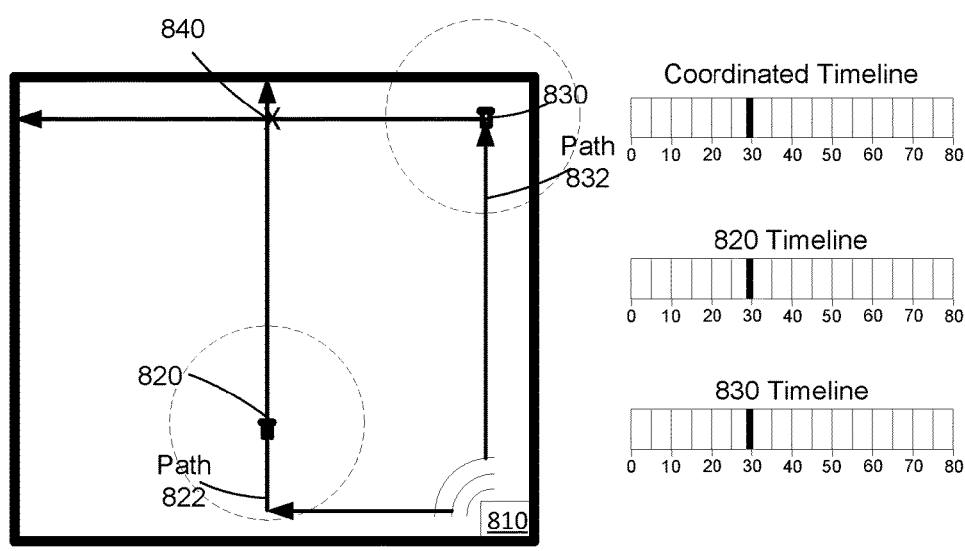

FIG. 8B illustrates a second instance in time, thirty seconds later than the first instance. In the elapsed thirty seconds both robotic device 820 and 830 executed portions of their respective time-parameterized paths and traveled to the positions shown in FIG. 8B. At this second instance in time, both robotic devices are still on schedule, and their rates of progress are the same.

Figure 8C:
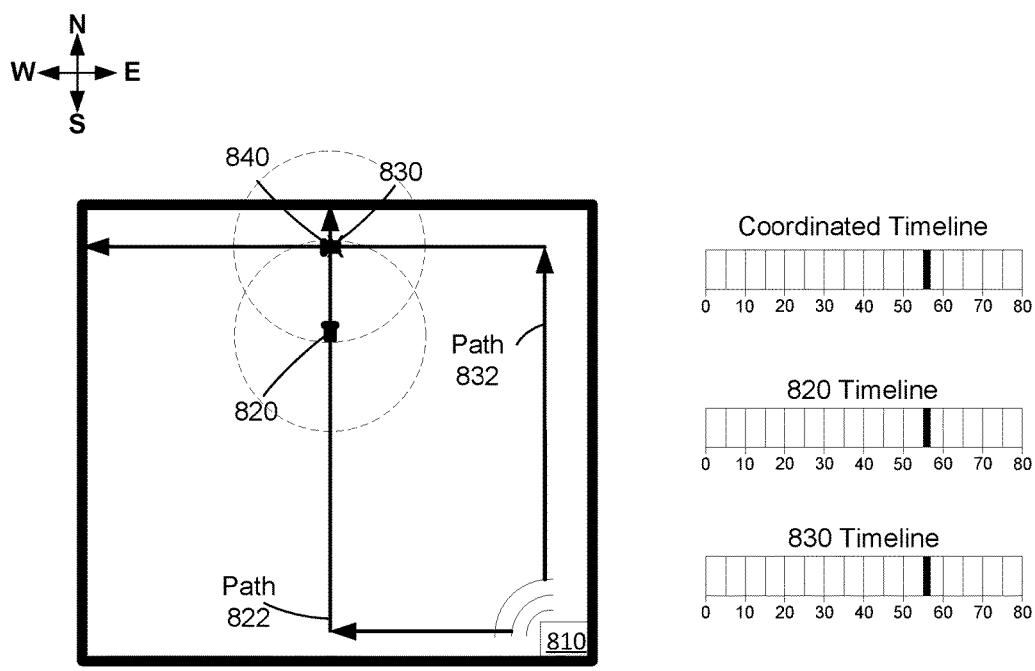

FIG. 8C illustrates a third instance in time that is fifty-five seconds later than the first instance in time. As first robotic device 820 approaches position 840, it may expect to meet second robotic device 830 (based on the indication of the second robotic device it received). Second robotic device 830 may transmit a communication signal to first robotic device 820 indicating that it is on schedule, and that the second rate of progress is zero seconds compared to the coordinated timeline. And because first robotic device 820 is also on schedule with a rate of progress of zero second relative to the coordinated timeline, there is no difference in their rates of progress. And as such, first robotic device 820 may take no action to modify its execution of first time-parameterized path 822.

Figure 8D:
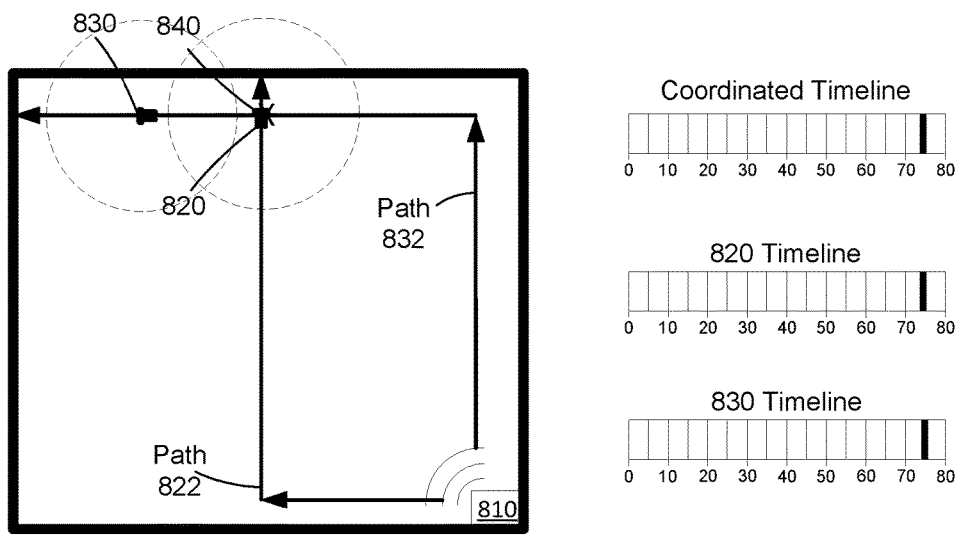

FIG. 8D illustrates a fourth instance in time that is seventy-five seconds later than the first instance in time. Both robotic devices are still on schedule, and due to the proper planning and coordination of the two paths, the robotic devices do not collide. At this fourth instance in time, second robotic device 830 has cleared position 840 and is travelling west, while first robotic device has reached position 840 on its northward trip.

FIGS. 9A-D illustrate a set of four instances in time during execution of an example embodiment, under conditions in which second robotic device 830 has fallen behind schedule, and first robotic device 820 responsively delays its execution of time-parameterized path 822 in order to sync with second robotic device 830.

Figure 9A:
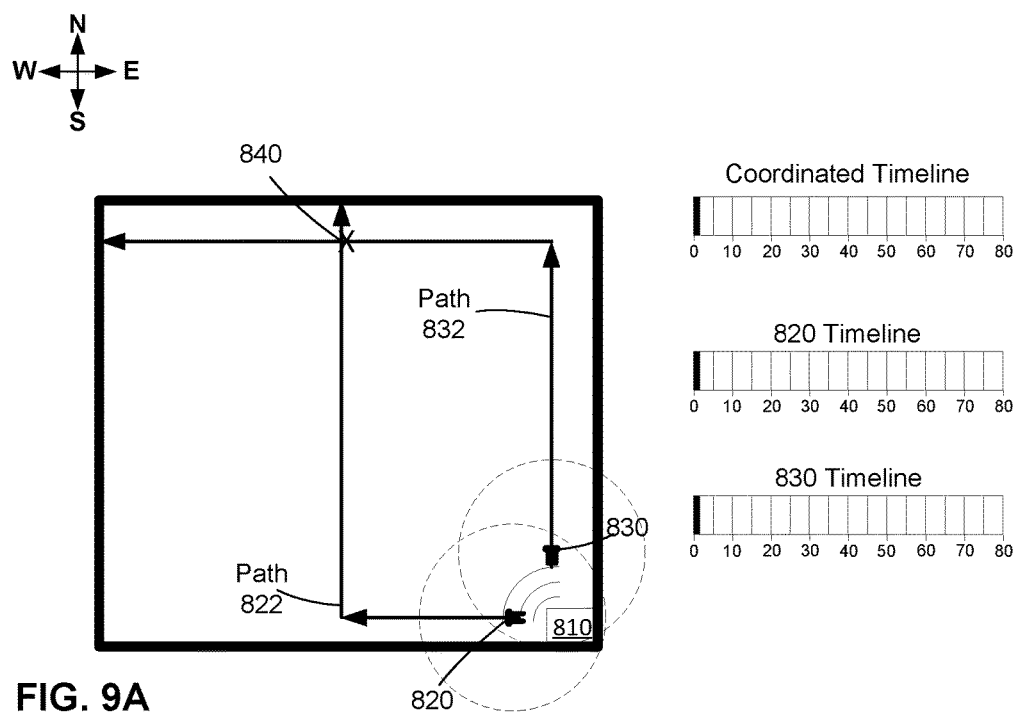
FIGS. 9A-D illustrate a second example sequence of four instances in time during execution of an embodiment of the present disclosure.

FIG. 9A may be similar or identical to FIG. 8A, in that both robotic devices receive respective time-parameterized paths, beginning at the same point in time, and overlapping at position 840.

Figure 9B:
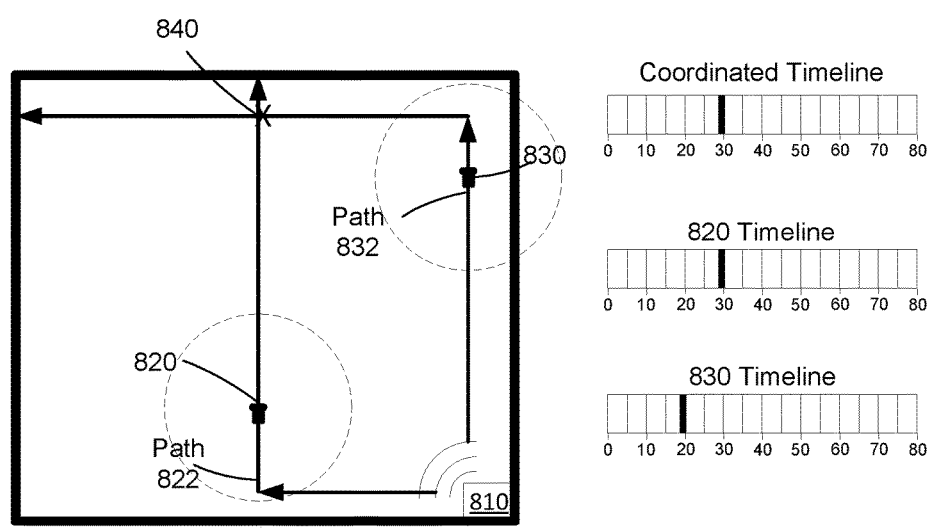

FIG. 9B illustrates a second instance in time thirty seconds later than the first instance in time. First robotic device 820 has traveled according to schedule, and thus has a rate of progress of zero seconds compared to the coordinated timeline. Second robotic device 830, however, has only travelled forward along time-parameterized path 832 by twenty seconds, and is therefore behind schedule by ten seconds. Second robotic device thus has a second rate of progress of negative ten seconds.

Figure 9C:
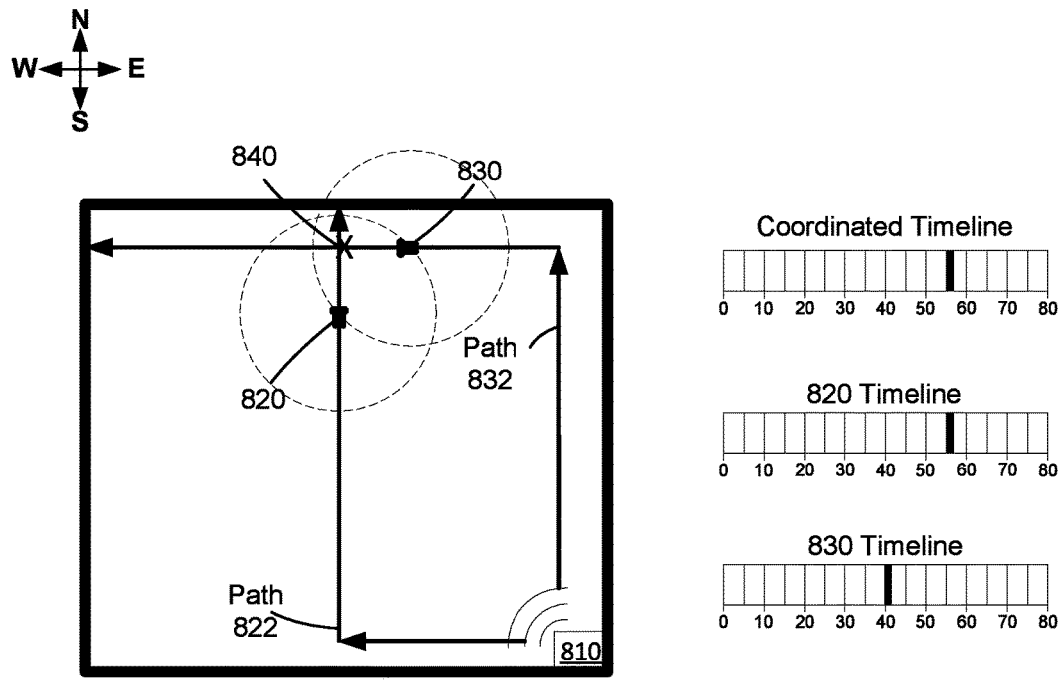

FIG. 9C illustrates a third instance in time that is fifty-five seconds later than the first instance in time. First robotic device 820 has progress according to schedule, and thus has a rate of progress of zero seconds. Second robotic device, however, has fallen behind by an additional five seconds, and thus has a second rate of progress of negative fifteen seconds.

As first robotic device 820 approaches position 840 (and comes within communication distance of second robotic device 830, as indicated by the dashed-line circles), it may expect to receive a communication signal from second robotic device 830 indicating the second rate of progress. First robotic device 820 receives the communication signal indicating that the second rate of progress of second robotic device 830 is negative fifteen seconds.

Then first robotic device 820 may stop moving for fifteen seconds (based on the received second rate of progress), in order to allow second robotic device 830 to "catch up" and sync the execution of the first and second time-parameterized paths by the respective robotic devices.

Figure 9D:
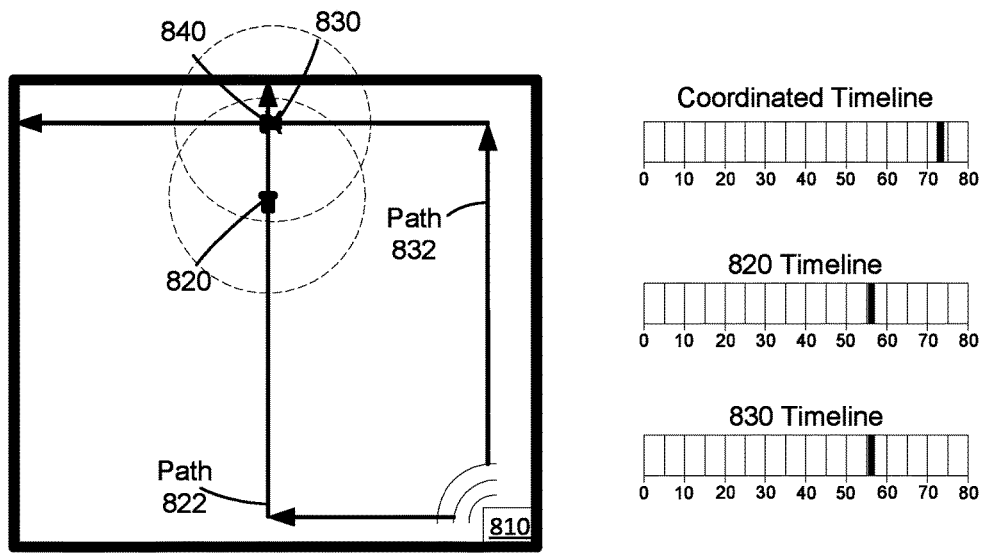

FIG. 9D illustrates a fourth instance in time that is seventy-five seconds later than the first instance in time. At this instance, first robotic device 820 has stopped for fifteen seconds and allowed second robotic device 830 to catch up. As can be seen in FIG. 9D, the rate of progress of both robotic devices is now negative fifteen seconds, compared to the coordinated timeline. Although both robotic devices are behind schedule at this point, they are behind schedule by the same amount, so the risk of a collision is avoided.

FIGS. 9A-D illustrate that first robotic device 820 modified execution of first time-parameterized path 822 by stopping and waiting for fifteen seconds. However, it should be understood that first robotic device 820 instead may have taken another action such as those described in this disclosure (slowed down movement, reversed or backtracked, etc.).

VI. EXAMPLE OPERATIONS

Figure 10:
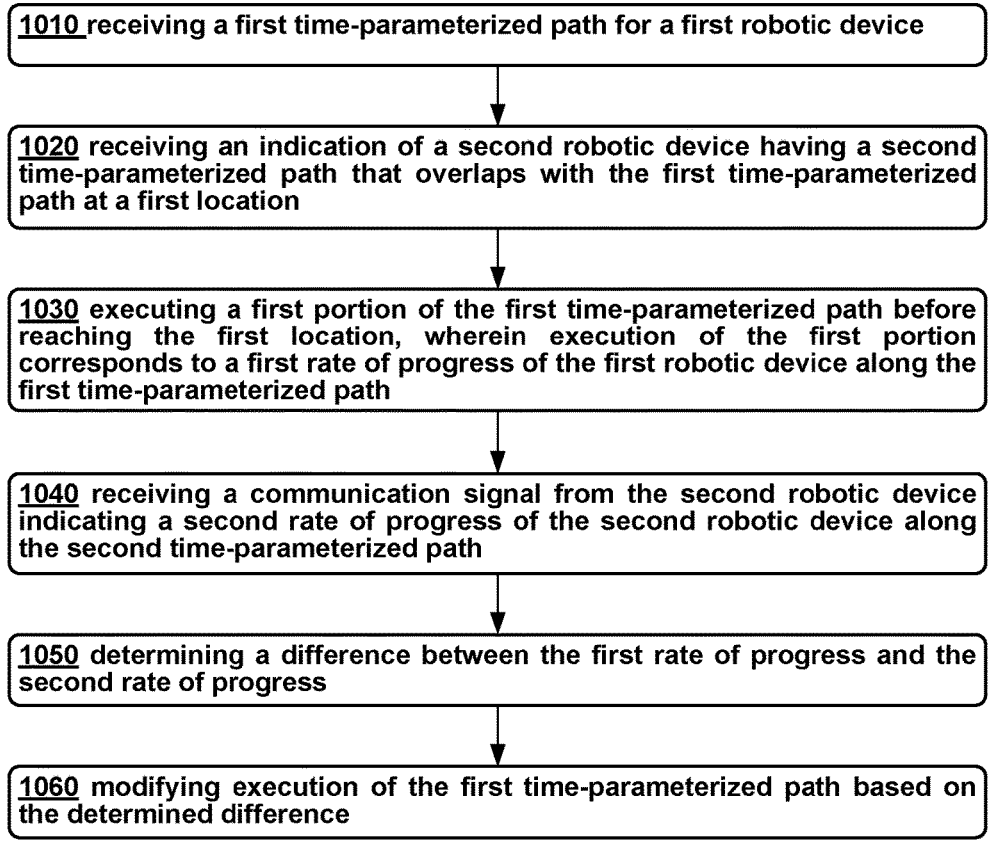
FIG. 10 is a flowchart of a method, in accordance with an example embodiment.

FIG. 10 illustrates a flowchart of an example method 1000. This example method may be executed by robotic device robotic devices 120, 720, 730, 820, or 830 warehouse management system 210, path planning system 710, computing device 600, computing clusters 609a-c, or one or more other computing devices or systems.

At block 1010, method 1000 may include receiving a first time-parameterized path for a first robotic device. The first time-parameterized path may correspond to a task that the first robotic device has been instructed to carry out.

At block 1020, method 1000 may include receiving an indication of a second robotic device having a second time-parameterized path that overlaps with the first time-parameterized path at a first location. The indication of the second robotic device may be used by the first robotic device to search for the second robotic device while the executing the first time-parameterized path, or to otherwise indicate or prepare to receive a communication from the second robotic device.

At block 1030, method 1000 may include executing a first portion of the first time-parameterized path before reaching the first location, wherein execution of the first portion corresponds to a first rate of progress of the first robotic device along the first time-parameterized path.

At block 1040, method 1000 may include receiving a communication signal from the second robotic device indicating a second rate of progress of the second robotic device along the second time-parameterized path.

At block 1050, method 1000 may include determining a difference between the first rate of progress and the second rate of progress.

And at block 1060, method 1000 may include modifying execution of the first time-parameterized path based on the determined difference.

In some embodiments, method 1000 may further include sending a communication signal to a third robotic device, wherein the communication signal indicates the rate of progress of the first and/or second robotic devices, a modified rated of progress, and adjustment or modification made to execution of the first and/or second time-parameterized paths, or other information pertaining to the first and second robotic devices.

Still further, method 1000 may include the first robotic device reporting to a path planning system any rates of progress, changes, modifications, or other information gathered or determined during execution of the first time-parameterized path. The reporting may occur when the first robotic device travels into an area or region of the environment that facilitates communication with the path planning system.

VII. CONCLUSION

Some examples disclosed herein have been described with reference to particular orientation or layout of robotic devices and coordinated paths. It should be appreciated that alternative orientations and layouts are possible and contemplated herein. It should also be understood that arrangements described herein are for purposes of example only. As such, those skilled in the art will appreciate that other arrangements and other elements (e.g. devices, systems, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The invention claimed is:

1. A method comprising:
   receiving, by a first robotic device, a first time-parameterized path for the first robotic device, wherein the first time-parameterized path comprises a first timeline of expected locations of the first robotic device;
   receiving, by the first robotic device, an indication of a second robotic device having a second time-parameterized path that overlaps with the first time-parameterized path at a first location, wherein the second time-parameterized path comprises a second timeline of expected locations of the second robotic device;
   executing, by the first robotic device, a first portion of the first time-parameterized path before reaching the first location, wherein execution of the first portion corresponds to a first rate of progress of the first robotic device along the first time-parameterized path;
   receiving, by the first robotic device, a communication signal from the second robotic device indicating a second rate of progress of the second robotic device along the second time-parameterized path;
   determining a difference in progress compared to a coordinated timeline between the first rate of progress and the second rate of progress; and
   modifying, by the first robotic device, execution of the first time-parameterized path based on the determined difference in order to avoid a collision between the first robotic device and the second robotic device at the first location.

2. The method of claim 1, further comprising:
   receiving, by the first robotic device, the second time-parameterized path; and
   based on the second time-parameterized path, the first robotic device determining a location along the first time-parameterized path at which to establish communication with the second robotic device.

3. The method of claim 1, wherein the second rate of progress indicates that the second robotic device is behind schedule by a given time amount, and wherein modifying execution of the first time-parameterized path comprises modifying execution of the first time-parameterized path such that the first robotic device is behind schedule by the given time amount.

4. The method of claim 1, wherein modifying, by the first robotic device, execution of the first time-parameterized path comprises adding a delay to the execution of the first time-parameterized path.

5. The method of claim 1, wherein modifying, by the first robotic device, execution of the first time-parameterized path comprises stopping execution of the first time-parameterized path.

6. The method of claim 1, wherein modifying execution of the first time-parameterized path comprises the first robotic device back-tracking to a previous position along the first time-parameterized path.

7. The method of claim 1, further comprising transmitting an instruction from the first robotic device to the second robotic device, wherein the instruction causes the second robotic device to speed up execution of the second time-parameterized path based on the determined difference.

8. The method of claim 1, further comprising:
   determining that the second rate of progress of the second robotic device along the second time-parameterized path is ahead of the first rate of progress of the first robotic device along the first time-parameterized path, wherein modifying, by the first robotic device, execution of the first time-parameterized path comprises speeding up the execution of the first time-parameterized path.

9. The method of claim 1, further comprising:
   determining that the difference between the first rate of progress and the second rate of progress is greater than a threshold temporal padding; and
   modifying, by the first robotic device, the execution of the first time-parameterized path based on the determination that the difference between the first rate of progress and the second rate of progress is greater than the threshold temporal padding.

10. The method of claim 1, further comprising:
    establishing communication between the first robotic device and a third robotic device; and
    transmitting, from the first robotic device to the third robotic device, an indication of the second rate of progress of the second robotic device along the second time-parameterized path.

11. The method of claim 1, further comprising:
    transmitting, by the first robotic device to a third robotic device, a communication signal indicating the first rate of progress of the first robotic device along the first time-parameterized path; and
    subsequent to modifying execution of the first time-parameterized path, (i) determining a modified rate of progress of the first robotic device and (ii) transmitting, by the first robotic device to the third robotic device, a communication signal indicating the modified rate of progress.

12. A system comprising:
    a first robotic device; and
    a second robotic device,
    wherein the first robotic device is configured to:
    receive a first time-parameterized path for the first robotic device, wherein the first time-parameterized path comprises a first timeline of expected locations of the first robotic device;
    receive an indication of a second robotic device having a second time-parameterized path that overlaps with the first time-parameterized path at a first location, wherein the second time-parameterized path comprises a second timeline of expected locations of the second robotic device;

execute a first portion of the first time-parameterized path before reaching the first location, wherein execution of the first portion corresponds to a first rate of progress of the first robotic device along the first time-parameterized path;

receive a communication signal from the second robotic device indicating a second rate of progress of the second robotic device along the second time-parameterized path;

determine a difference in progress compared to a coordinated timeline between the first rate of progress and the second rate of progress; and modify execution of the first time-parameterized path based on the determined difference in order to avoid a collision between the first robotic device and the second robotic device at the first location.

13. The system of claim 12, wherein the first robotic device is further configured to:

receive the second time-parameterized path; and based on the second time-parameterized path, determine a location along the first time-parameterized path at which to establish communication with the second robotic device.

14. The system of claim 12, wherein the first robotic device is further configured to:

determine that the difference between the first rate of progress and the second rate of progress is greater than a threshold temporal padding; and modify the execution of the first time-parameterized path based on the determination that the difference between the first rate of progress and the second rate of progress is greater than the threshold temporal padding.

15. The system of claim 12, further comprising a path planning system that is configured to provide the first time-parameterized path for the first robotic device and the second time-parameterized path for the second robotic device such that each of the first and second time-parameterized paths begin and end in locations with connectivity to the path planning system based on a predetermined connectivity map of an environment.

16. The system of claim 15, wherein the first location lacks connectivity with the path planning system, and wherein the first robotic device is further configured to report the second rate of progress of the second robotic device to the path planning system after passing the first location and entering a region with connectivity to the path planning system.

17. A non-transitory, computer-readable medium having instructions stored thereon that when executed, cause performance of a set of acts comprising:

receiving a first time-parameterized path for the first robotic device, wherein the first time-parameterized path comprises a first timeline of expected locations of the first robotic device;

receiving an indication of a second robotic device having a second time-parameterized path that overlaps with the first time-parameterized path at a first location, wherein the second time-parameterized path comprises a second timeline of expected locations of the second robotic device;

executing a first portion of the first time-parameterized path before reaching the first location, wherein execution of the first portion corresponds to a first rate of progress of the first robotic device along the first time-parameterized path;

receiving a communication signal from the second robotic device indicating a second rate of progress of the second robotic device along the second time-parameterized path;

determining a difference in progress compared to a coordinated timeline between the first rate of progress and the second rate of progress; and modifying execution of the first time-parameterized path based on the determined difference in order to avoid a collision between the first robotic device and the second robotic device at the first location.

18. The non-transitory, computer-readable medium of claim 17, the set of acts further comprising:

receiving the second time-parameterized path; and based on the second time-parameterized path, determining a location along the first time-parameterized path at which to establish communication with the second robotic device.

19. The non-transitory, computer-readable medium of claim 17, the set of acts further comprising:

determining that the difference between the first rate of progress and the second rate of progress is greater than a threshold temporal padding; and modifying the execution of the first time-parameterized path based on the determination that the difference between the first rate of progress and the second rate of progress is greater than the threshold temporal padding.

* * * * *